US011864537B2

(12) United States Patent
Stone et al.

(10) Patent No.: US 11,864,537 B2
(45) Date of Patent: Jan. 9, 2024

(54) AI BASED FEEDING SYSTEM AND METHOD FOR LAND-BASED FISH FARMS

(71) Applicant: ReelData Inc., Halifax (CA)

(72) Inventors: William Stone, Halifax (CA); Pedram Adibi, Halifax (CA)

(73) Assignee: ReelData Inc., Halifax (CA)

( * ) Notice: Subject to any disclaimer, the term of this patent is extended or adjusted under 35 U.S.C. 154(b) by 0 days.

(21) Appl. No.: 17/688,405

(22) Filed: Mar. 7, 2022

(65) Prior Publication Data

US 2022/0279765 A1 Sep. 8, 2022

Related U.S. Application Data

(60) Provisional application No. 63/157,759, filed on Mar. 7, 2021.

(51) Int. Cl.
*A01K 61/80* (2017.01)
*G05B 13/02* (2006.01)
*A01K 61/10* (2017.01)

(52) U.S. Cl.
CPC .............. *A01K 61/80* (2017.01); *A01K 61/10* (2017.01); *G05B 13/0265* (2013.01)

(58) Field of Classification Search
CPC ..... A01K 61/10; A01K 61/80; G05B 13/0265
See application file for complete search history.

(56) References Cited

U.S. PATENT DOCUMENTS

| 5,732,655 A | 3/1998 | Baba et al. |
| 5,961,831 A | 10/1999 | Lee et al. |
| 6,171,480 B1 | 1/2001 | Lee et al. |

(Continued)

FOREIGN PATENT DOCUMENTS

| CN | 110074030 B | 11/2020 |
| EP | 1510125 B1 | 4/2009 |

(Continued)

OTHER PUBLICATIONS

Foster et al., "Detection and Counting of Uneaten Food Pellets in a Sea Cage Using Image Analysis". Aquacultural Engineering vol. 14(3), pp. 251-269, ISSN 0144-8609 [online] (Jun. 4, 2022) <https://doi.org/10.1016/0144-8609(94)00006-M>.

(Continued)

*Primary Examiner* — Monica L Perry
*Assistant Examiner* — Aaron M Rodziwicz
(74) *Attorney, Agent, or Firm* — BERESKIN & PARR LLP/S.E.N.C.R.L. s.r.l; Tonino Rosario Orsi

(57) ABSTRACT

An AI-based system and method for feed monitoring in a land-based fish farm, where the fish farm has a tank containing fish and an effluent pipe that is coupled to the tank where uneaten feed pellets and non-pellet objects flow through the effluent pipe to an exit port. A feed camera is mounted to an effluent pipe for capturing a video feed having images of objects that traverse a field of view of the feed camera when each image is acquired. A special-purpose computer executes a pellet-tracking algorithm that employs a region of interest (ROI) proposal module, an ROI classification module, an ROI tracking module, and a trajectory classification module for at least counting uneaten feed pellets. The computer generates in real time a pellet count based on the pellet trajectories.

27 Claims, 11 Drawing Sheets

(56) References Cited

U.S. PATENT DOCUMENTS

| | | | |
|---|---|---|---|
| 6,510,815 | B1 | 1/2003 | Lagardere |
| 6,669,970 | B2 | 12/2003 | Ang et al. |
| 7,001,519 | B2 | 2/2006 | Linden et al. |
| 7,827,015 | B2 | 11/2010 | Mcgoogan et al. |
| 8,159,525 | B2 | 4/2012 | Park et al. |
| 8,506,799 | B2 | 8/2013 | Jorden et al. |
| 8,608,404 | B2 | 12/2013 | Safreno |
| 8,955,457 | B2 | 2/2015 | Chen et al. |
| 9,024,223 | B2 | 5/2015 | Miyamoto et al. |
| 10,068,195 | B2 | 9/2018 | New et al. |
| 10,163,199 | B2 | 12/2018 | Gilmore et al. |
| 10,191,489 | B1 | 1/2019 | Rapoport et al. |
| 10,534,967 | B2 | 1/2020 | Atwater et al. |
| 10,568,305 | B2 | 2/2020 | Kanwal et al. |
| 10,599,147 | B1 | 3/2020 | Rapoport et al. |
| 10,856,520 | B1 | 12/2020 | Kozachenok et al. |
| 10,863,728 | B2 | 12/2020 | Vrehen et al. |
| 11,297,247 | B1* | 4/2022 | James .................. H04N 7/18 |
| 11,662,291 | B1 | 5/2023 | Holm |
| 2005/0229864 | A1 | 10/2005 | Chanceaulme Willemsen et al. |
| 2008/0154568 | A1 | 6/2008 | Burghardi et al. |
| 2009/0018675 | A1 | 1/2009 | Sesay |
| 2013/0206078 | A1 | 8/2013 | Melberg et al. |
| 2015/0196002 | A1 | 7/2015 | Friesth |
| 2017/0006840 | A1 | 1/2017 | Barry |
| 2017/0099812 | A1 | 4/2017 | Chang |
| 2018/0064071 | A1 | 3/2018 | Goldsborough et al. |
| 2019/0021292 | A1* | 1/2019 | Hayes .................. A01K 63/06 |
| 2019/0274282 | A1 | 9/2019 | Black |
| 2019/0340440 | A1* | 11/2019 | Atwater .................. A01K 61/90 |
| 2020/0068858 | A1 | 3/2020 | Ayers et al. |
| 2020/0104602 | A1 | 4/2020 | Atwater et al. |
| 2020/0113158 | A1 | 4/2020 | Rishi et al. |
| 2020/0154682 | A1 | 5/2020 | Kanwal et al. |
| 2020/0170227 | A1 | 6/2020 | Rishi et al. |
| 2020/0196568 | A1 | 6/2020 | Robertson et al. |
| 2020/0375155 | A1 | 12/2020 | Ye et al. |
| 2021/0022322 | A1 | 1/2021 | Saleh et al. |
| 2021/0045364 | A1 | 2/2021 | Huang et al. |
| 2021/0279860 | A1* | 9/2021 | Ye .................. G06T 7/0008 |
| 2022/0272952 | A1 | 9/2022 | Holm |
| 2022/0361459 | A1* | 11/2022 | Yao .................. A01K 61/80 |
| 2022/0390275 | A1* | 12/2022 | James .................. A01K 79/00 |
| 2023/0017422 | A1* | 1/2023 | Brentano .................. A01K 61/90 |

FOREIGN PATENT DOCUMENTS

| | | |
|---|---|---|
| EP | 2178362 B1 | 11/2016 |
| ES | 2791551 A1 | 11/2020 |
| JP | 6739049 B2 | 5/2020 |
| NO | 344459 B1 | 12/2019 |
| SE | 9804384 | 12/1998 |
| WO | 199720186 A1 | 6/1997 |
| WO | 2009008733 A1 | 1/2009 |
| WO | 2014098614 A1 | 6/2014 |
| WO | 2018111124 A2 | 6/2018 |
| WO | 2019245722 A1 | 12/2019 |
| WO | 2020046523 A1 | 3/2020 |
| WO | 2020046524 A1 | 3/2020 |
| WO | 2020096461 A1 | 5/2020 |
| WO | 2020250330 A1 | 12/2020 |
| WO | 346398 B1 | 7/2022 |
| WO | 2022191713 A1 | 9/2022 |

OTHER PUBLICATIONS

Parra et al., "The Use of Sensors for Monitoring the Feeding Process and Adjusting the Feed Supply Velocity in Fish Farms". Journal of Sensors, Oct. 8, 2018, vol. 2018, [online] (Jun. 4, 2022) <https://doi.org/10.1155/2018/1060987>.

Douillard, "3 Small But Powerful Convolutional Networks" published in Towards Data Science, May 13, 2018 https://towardsdatascience.com/3-small-but-powerful-convolutional-networks-27ef86faa42d.

Expert in Camera Module Solution, Shenzhen ChuangMu Technology Co., Ltd (accessed Dec. 3, 2022) <http://www.camera-module.com/product/raspberrypicameramod/8mp-raspberry-pi-camera-module-sony-imx219-sensor.html>.

Helmholtz Stereopsis (accessed Dec. 5, 2022) <https://pages.cs.wisc.edu/~vishala/helmholtz/>.

Stereo Vision III (accessed Dec. 5, 2022) <https://cseweb.ucsd.edu/classes/sp07/cse152/lec15.pdf>.

Find Light Blog, X-Ray Diffraction: Getting to Know Crystal Structures (Part I) (2021) <https://www.findlight.net/blog/get-to-know-crystal-structure-with-x-ray/>.

North Technology People, "Mathew Zimola @ ReelData", online on YouTube.com, Nov. 1, 2020 <https://www.youtube.com/watch?v=RL_5nuoyOzo>.

Evans, "AI technology firm signs deal with Atlantic Sapphire" (2020) IntraFish <https://www.intrafish.com/salmon/ai-technology-firm-signs-deal-with-atlantic-sapphire/2-1-888286>.

Moreira, "ReelData Sells to Atlantic Sapphire" (2020) Entrevestor <https://entrevestor.com/home/entry/reeldata-sells-to-atlantic-sapphire>.

* cited by examiner

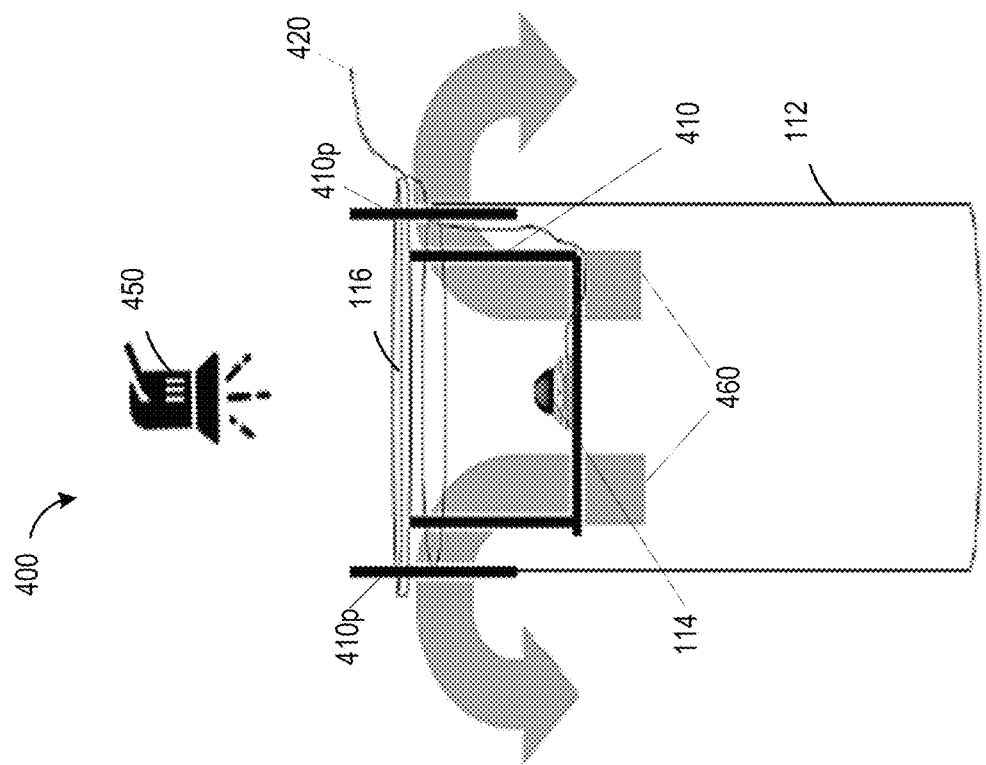
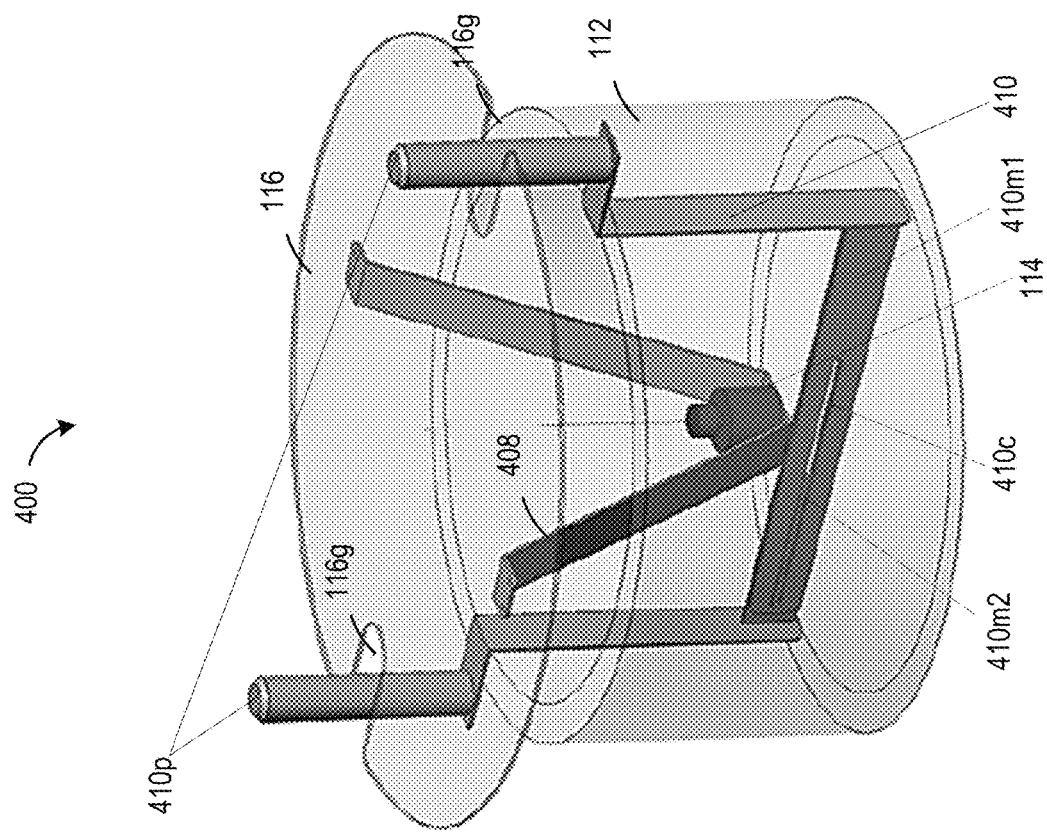
FIG. 4A
FIG. 4B

AI BASED FEEDING SYSTEM AND METHOD FOR LAND-BASED FISH FARMS

CROSS-REFERENCE TO RELATED PATENT APPLICATION

This application claims the benefit of U.S. Provisional Patent Application No. 63/157,759 filed Mar. 7, 2021, and the entire contents of U.S. Provisional Patent Application No. 63/157,759 are hereby incorporated herein in its entirety.

FIELD

Various embodiments are described herein that generally relate to systems and methods for automated feeding in a fish farm using artificial intelligence (AI).

BACKGROUND

The following paragraphs are provided by way of background to the present disclosure. They are not, however, an admission that anything discussed therein is prior art or part of the knowledge of persons skilled in the art.

Land-based aquaculture is a new approach to the production of fish. Rather than using the natural habitat of the fish in the ocean and growing fish in ocean-based cages, land-based aquaculture brings fish on land by recreating their natural environment in tanks. The systems constantly have water circulating and filtered through them and attempt to obtain the optimal balance of environmental parameters to assure fish health and growth. This closed system approach comes with many benefits including eliminating problems related to contamination, environmental optimization, parasites, predators, and escapes. Furthermore, it enables farms to be close to consumer markets resulting in decreased transportation distances and thus emissions.

Despite the sophistication demanded to create these land-based systems, feeding practices remained less advanced. While each farm approaches feeding differently, every land-based farm operator tries their best to maintain an understanding of wasted feed levels. Many use qualitative monitoring of waste as a baseline (which is highly inaccurate) while others physically count wasted feed pellets caught in filters (which is inaccurate, discrete, and/or time consuming). After gauging the appetite of the population via these methods, operators then adjust mechanical feeding systems based on their beliefs of wasted feed. The inefficiencies of the aforementioned methods lead to two clear problems for farm operators when waste is misjudged: (1) they overfeed the fish, which can waste a considerable amount of fish feed, resulting in increased cost and negative environmental impact; or (2) they underfeed the fish population, resulting in reduced growth and thus unrealized revenues. Finally, constant dynamics with feed waste contribute to fluctuating environmental and water quality parameters, stressing fish and filtration systems.

Challenges in developing automated feeding technologies are numerous. Perhaps most notable is the vital importance of precision. Small margins of error can result in instances of substantial waste or starvation. In the ocean-based sector, several solutions have been proposed but all ignore this reality by using a measure of pellet intensity or an exact measure of some inconsistent cross-section in space and an instance in time, both of which provide only rough estimates of waste. Moreover, any method that has attempted to increase precision does so by leveraging increased computational resources, which inflates cost beyond what is industrially feasible.

There is a need for a system and method for automated feeding in a fish farm that addresses the challenges and/or shortcomings described above.

SUMMARY OF VARIOUS EMBODIMENTS

Various embodiments of a system and method for AI-based feeding in a fish farm, and computer products for use therewith, are provided according to the teachings herein.

According to one aspect of the invention, there is disclosed a system for feed monitoring in a land-based fish farm having a tank containing fish, the system comprising: a feed camera secured to an effluent pipe that is coupled to the tank where uneaten feed pellets and non-pellet objects flow through the effluent pipe to an exit port, the feed camera being configured to capture a video feed comprising images of an interior of the effluent pipe including objects that traverse a field of view of the feed camera when each image is acquired, the objects comprising pellets and non-pellet objects; an object enhancer that is mounted to the effluent pipe so that the object enhancer is opposite to and in the field of view of the feed camera to provide a background for the feed camera so that the objects that pass between the feed camera and the object enhancer and are captured in at least one of acquired image of the video feed have a definable perimeter in the at least one acquired image; a computing device comprising at least one processor and a non-transient computer-readable medium having stored thereon instructions that when executed cause the at least one processor to perform steps of: obtaining several images from the video feed for a given time interval; preprocessing the images to obtain candidate regions of interest (ROIs) that each correspond to unique objects in the images where the objects are potentially feed pellets; performing classification on the candidate ROIs to obtain a pelletness score representing a probability that the object that corresponds to the candidate ROI belongs to a feed pellet class; determining whether to retain the candidate ROIs based on a likelihood that the retained candidate ROI is more likely to belong to the feed pellet class; assigning each of the retained candidate ROIs into trajectories; classifying the trajectories into pellet trajectories or non-pellet trajectories; and generating in real time a pellet count based on the pellet trajectories where the pellet count represents a predetermined percentage of the uneaten feed pellets that were not consumed by the fish in the tank.

In at least one embodiment, the at least one processor is further configured to send the pellet count to the fish farm where the pellet count is used by a fish feeder machine to generate a new amount of fish feed to provide to the tank based at least in part on the pellet count.

In at least one embodiment, the at least one processor is further configured to generate a control signal based on the pellet count and send the control signal to a fish feeder machine of the fish farm to a generate a new amount of fish feed to provide to the tank.

In at least one embodiment, the at least one processor is further configured to determine gradients of the uneaten feed pellets in the time interval and to generate an alert when one of the gradients is larger than a gradient threshold.

In at least one embodiment, the object enhancer is a high-density polyethylene (HDPE) sheet that provides a background producing a contrast with respect to the objects passing between the feed camera and the object enhancer.

In at least one embodiment, the at least one processor is configured to obtain the candidate ROIs in a given image frame by performing background subtraction on the given image frame to identify any objects that are likely to change position in subsequent image frames, perform contour detection on the identified objects to define a boundary for each identified object where the boundary is a potential ROI, and filtering the potential ROIs to obtain the candidate ROIs.

In at least one embodiment, the at least one processor is configured to perform classification on the candidate ROIs by generating samples for each candidate ROI where a given sample include image data for a corresponding candidate ROI, preprocessing the samples, applying an ROI classifier to each preprocessed sample to generate a probability distribution with probabilities that the sample belongs to different classes.

In at least one embodiment, the classes include a pellet class, a non-pellet class and an ambiguous class.

In at least one embodiment, the pelletness score represents a probability that the sample belongs to the pellet class.

In at least one embodiment, the at least one processor is configured to preprocess the samples by resizing the samples to have a same matrix size and performing mean-centering normalization.

In at least one embodiment, the at least one processor is configured to assign each of the candidate ROIs in one image frame into one of the trajectories by: (a) assigning the candidate ROIs to separate new trajectories when there are no active trajectories; (b) when there are active trajectories assigning the candidate ROIs to a closest active trajectory when distances between locations of the candidate ROIs and a last ROI in the closest active trajectories is smaller than a distance threshold or (c) when there are active trajectories assigning the candidate ROIs to a new active trajectory when distances between locations of the candidate ROIs and a last ROI in the closest active trajectories is larger than the distance threshold.

In at least one embodiment, the at least one processor is configured to classify the trajectories into pellet trajectories or non-pellet trajectories by identifying finished trajectories which include trajectories that are not updated for one of the images in the given time period, determining at least one trajectory measurement for each of the finished trajectories, and determining which finished trajectories belong to the pellet trajectory class based on the at least one trajectory measurement.

In at least one embodiment, the at least one processor is configured to determine which finished trajectories belong to the pellet trajectory class by comparing the at least one trajectory measurement to a threshold or providing the at least one trajectory measurement to a trajectory classifier.

In at least one embodiment, at least one trajectory measurement includes a length of the finished trajectory, a distribution of pelletness scores of ROIs that comprise the finished trajectory, and/or at least one measure of a statistical distributions of one or more other filter values.

In at least one embodiment, the feed camera is connected to an underside of the object enhancer and is spaced apart from the object enhancer so that the acquired images show at least a portion of the object enhancer.

In at least one embodiment, the system further comprises a bracket that is attached to the effluent pipe and the object enhancer is mounted to the bracket at two locations to restrict rotatability of the object enhancer and the feed camera during use.

In at least one embodiment, the object enhancer is slidably mounted adjacent to the exit port of the effluent pipe so that the object enhancer can move away from the exit port during times when an increased amount of water flow exits the effluent pipe.

In at least one embodiment, the feed camera is secured to a bracket adjacent the effluent pipe and the object enhancer is slidably mounted on posts above the bracket.

In at least one embodiment, the feed camera is secured to the effluent pipe and the object enhancer is slidably mounted adjacent to the effluent pipe so that the object enhancer can move up and down when different amounts of water flow exit the effluent pipe.

In at least one embodiment, the object enhancer is slidably mounted adjacent to the effluent pipe and the feed camera is coupled to the object enhancer at a fixed distance away from the object enhancer so that the object enhancer can move up and down when different amounts of water flow exit the effluent pipe and the feed camera remains at the fixed distance away from the object enhancer.

In another broad aspect, in accordance with the teachings herein, there is provided a computer-implemented method for feed monitoring in a tank of a land-based fish farm, the method comprising: reading image frames and associated meta-data from a video feed obtained from a feed camera for a given time interval where the image frames obtained by the feed camera are images of uneaten feed pellets and non-pellet objects that are expelled via from the tank; preprocessing the image frames to obtain candidate regions of interest (ROIs) that each correspond to unique objects in the images where the objects are potentially feed pellets; performing classification on the candidate ROIs to obtain pelletness scores representing a probability that the objects that correspond to the candidate ROIs belong to a feed pellet class; determining whether to retain the candidate ROIs based on how likely the candidate ROI is to belong to the feed pellet class; assigning each of the retained candidate ROIs into trajectories; classifying the trajectories into pellet trajectories or non-pellet trajectories; and generating in real time a pellet count based on the pellet trajectories where the pellet count represents a predetermined percentage of the uneaten feed pellets that were not consumed by the fish in the tank.

In at least one embodiment, the method further comprises sending the pellet count to the fish farm where the pellet count is used by a fish feeder machine to generate a new amount of fish feed to provide to the tank based at least in part on the pellet count.

In at least one embodiment, the method further comprises generating a control signal based on the pellet count and sending the control signal to a fish feeder machine of the fish farm to a generate a new amount of fish feed to provide to the tank.

In at least one embodiment, the method further comprises determining gradients of the uneaten feed pellets in the given time interval and generating an alert when one of the gradients is larger than a gradient threshold.

In at least one embodiment, obtaining the candidate ROIs in a given image frame comprises performing background subtraction on the given image frame to identify any objects that are likely to change position in subsequent image frames, performing contour detection on the identified objects to define a boundary for each identified object where the boundary is a potential ROI, and filtering the potential ROIs to obtain the candidate ROIs.

In at least one embodiment, performing classification on the candidate ROIs comprises generating samples for each candidate ROI where a given sample include image data for a corresponding candidate ROI, preprocessing the samples, and applying an ROI classifier to each preprocessed sample to generate a probability distribution with probabilities that the sample belongs to different classes.

In at least one embodiment, the classes include a pellet class, a non-pellet class and an ambiguous class.

In at least one embodiment, the pelletness score represents a probability that the sample belongs to the pellet class.

In at least one embodiment, the method comprises preprocessing the samples by resizing the samples to have a same matrix size and performing mean-centering normalization.

In at least one embodiment, assigning each of the candidate ROIs in one image frame into one of the trajectories comprises: (a) assigning the candidate ROIs to separate new trajectories when there are no active trajectories; (b) when there are active trajectories assigning the candidate ROIs to a closest active trajectory when distances between locations of the candidate ROIs and a last ROI in the closest active trajectories is smaller than a distance threshold or (c) when there are active trajectories assigning the candidate ROIs to a new active trajectory when distances between locations of the candidate ROIs and a last ROI in the closest active trajectories is larger than the distance threshold.

In at least one embodiment, classifying the trajectories into pellet trajectories or non-pellet trajectories comprises identifying finished trajectories which include trajectories that are not updated for one of the images in the given time period, determining at least one trajectory measurement for each of the finished trajectories, and determining which finished trajectories belong to the pellet trajectory class based on the at least one trajectory measurement.

In at least one embodiment, determining which finished trajectories belong to the pellet trajectory class comprises comparing the at least one trajectory measurement to a threshold or providing the at least one trajectory measurement to a trajectory classifier.

In at least one embodiment, at least one trajectory measurement includes a length of the finished trajectory, a distribution of pelletness scores of ROIs that comprise the finished trajectory, and/or at least one measure of a statistical distribution of other or more filter values.

In at least one embodiment, the method comprises mounting an object enhancer adjacent an outlet of the effluent pipe opposite to and in the field of view of the feed camera to provide a background for the feed camera so that the objects in the acquired images have a definable perimeter; and securing the feed camera to object enhancer so that the video feed obtained by the feed camera comprises image frames that are images of the object enhancer and include objects that traverse the field of view of the feed camera when the images are acquired.

In at least one embodiment, the method comprises using a high-density polyethylene (HDPE) sheet for the object enhancer to provide a background that produces an increased contrast with respect to the objects passing between the feed camera and the object enhancer.

In another broad aspect, in accordance with the teachings herein, there is provided a system for feed monitoring in a land-based fish farm having a tank containing fish, the system comprising: a feed camera mounted to an effluent pipe that is coupled to the tank, the feed camera being configured to capture a video feed comprising images of objects that traverse a field of view of the feed camera when each image is acquired, the objects comprising pellets and non-pellet objects; and a computing device comprising at least one processor and a non-transient computer-readable medium having stored thereon instructions that when executed cause the at least one processor to perform any of the methods described in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 4A and 4B show perspective and side cross-sectional views of an example embodiment of a bracket configuration (e.g., mounting assembly) at a portion of an effluent pipe where the bracket configuration is coupled to the background enhancer of FIG. 2A.

Figure 1:
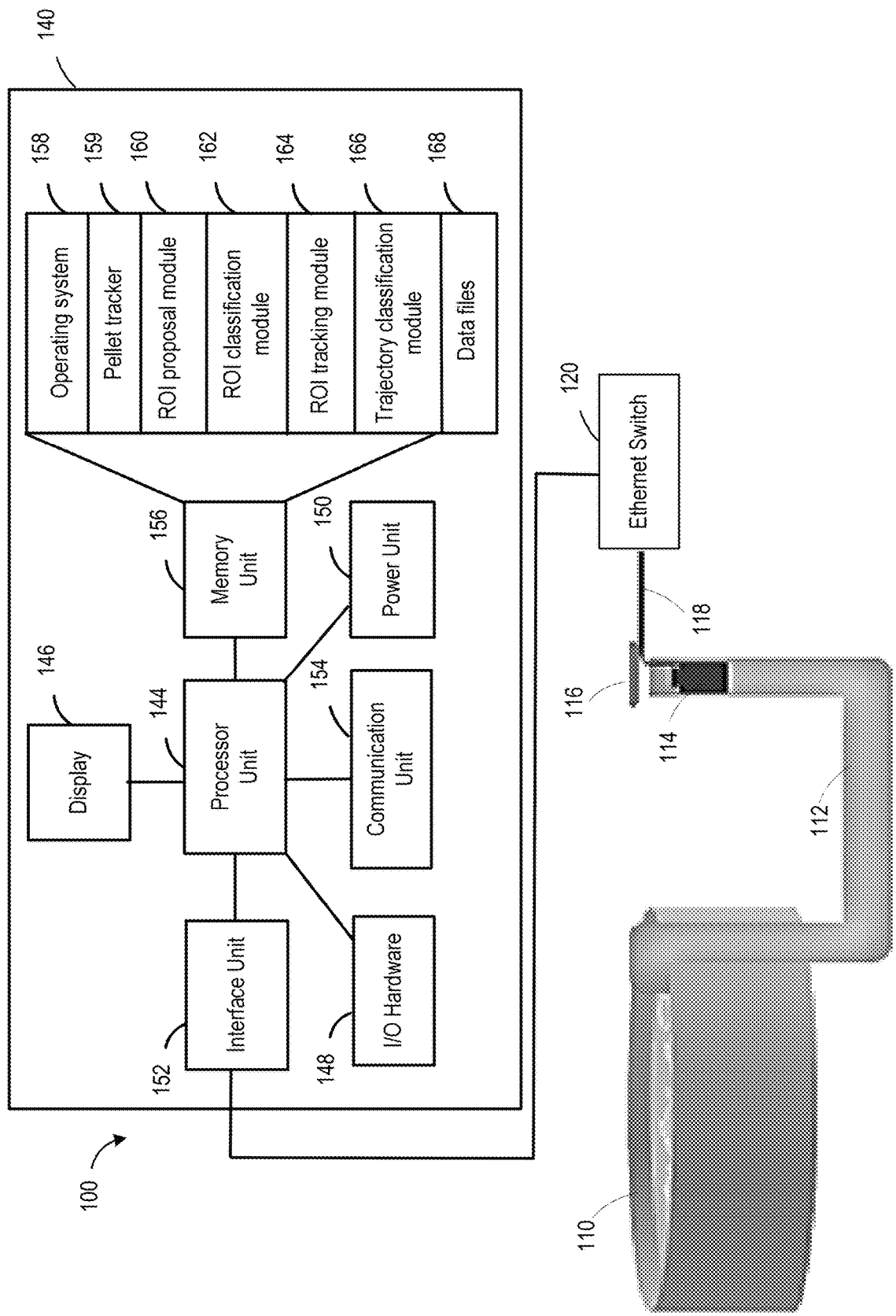
FIG. 1 shows a schematic diagram of an example embodiment of a system for AI-based feeding in a fish farm.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface, such as a graphical user interface (GUI), for performing initialization, configuration, or other user operations.

The example embodiments of the devices, systems, or methods described in accordance with the teachings herein are generally implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, one or more sensors, and the like depending on the implementation of the hardware.

It should also be noted that some elements that are used to implement at least part of the embodiments described herein may be implemented via software that is written in a high-level procedural language such as object-oriented programming. The program code may be written in C++, C#, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

In accordance with the teachings herein, there are provided various embodiments for a system and method for AI-based feeding in a fish farm, and computer products for use therewith.

Reference is first made to FIG. 1, showing a schematic diagram of an example embodiment of a feed counting system 100 for AI-based feeding in a fish farm. The feed counting system 100 includes a tank 110, an effluent pipe 112, a feed camera 114 secured in the effluent pipe 112, an object enhancer 116, an ethernet cable 118, an ethernet switch 120, and a computer 140. The effluent pipe 112 can also be referred to as an outlet pipe. The object enhancer 116 can also be referred to as a profile enhancer or background enhancer. It should be noted that in alternative embodiments, some elements may be implemented using other elements such as the ethernet cable 118 and the ethernet switch 120 which may be implemented using other networking elements.

The feed camera 114 (which may be a single IP camera) and the object enhancer 116 are placed into the effluent pipe 112 generally opposite one another. As camera technology continues to develop every year, the technical specifications for the feed camera 114 may evolve over time. However, certain specifications for the feed camera 114 that may be considered are resolution and exposure. For example, a resolution of 576×704 and an exposure of ½₅₀ may be suitable for use with the system 100. This enables the collection of high-quality data since the object enhancer 116 provides a background for the field of view of the feed camera 114 so that objects that pass between the feed camera 114 and the object enhancer 116 and are captured in the images acquired by the feed camera 114 have a definable perimeter in at least one of the acquired images in the video feed.

Figure 2B:
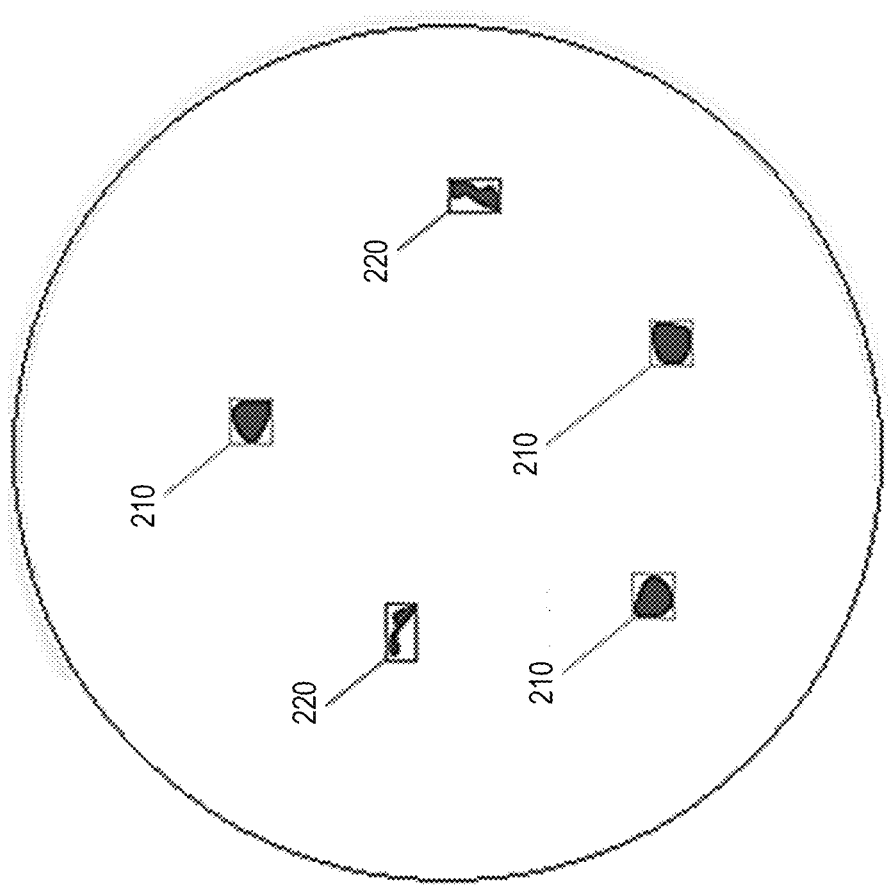
FIG. 2B shows a schematic diagram of an example image against the object enhancer of FIG. 2A.
Figure 2A:
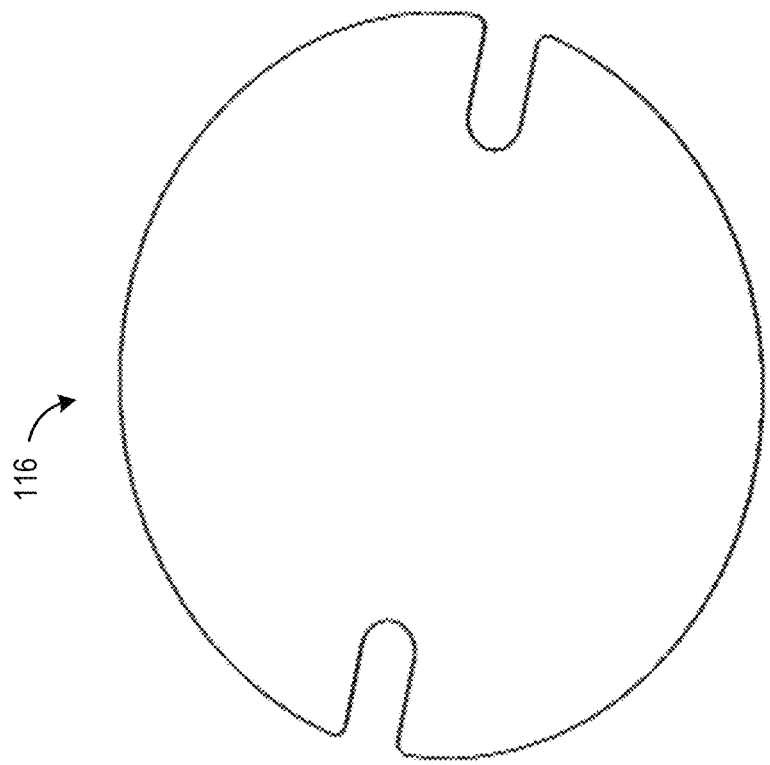
FIG. 2A shows a schematic diagram of an example embodiment of an object enhancer.
Figure 3:
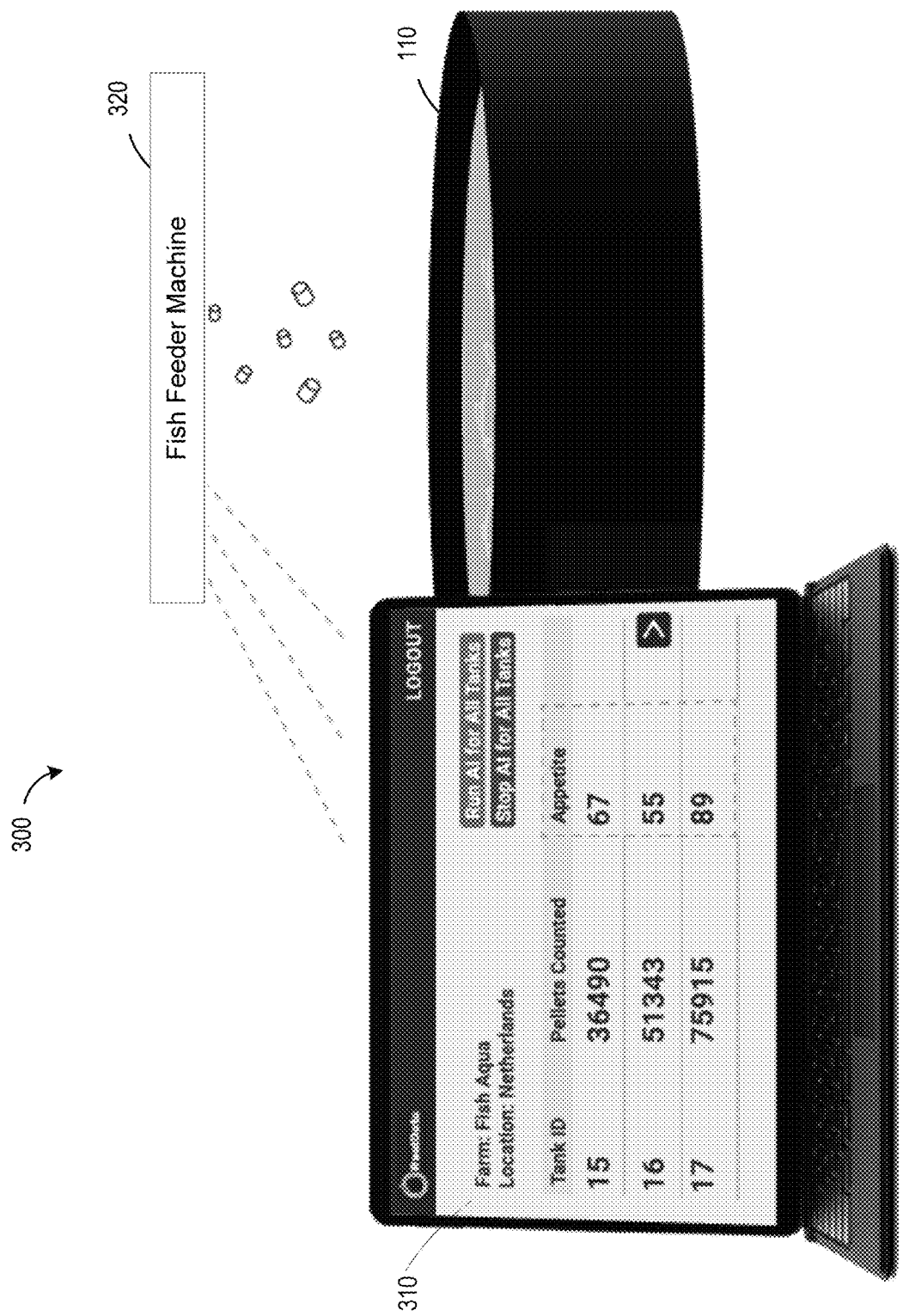
FIG. 3 shows a schematic diagram of an example screenshot of an API for use with the system of FIG. 1.

The shape of the object enhancer 116 can be generally circular with grooves that receives fasteners to secure it in place (e.g., as shown in FIG. 2A) in the effluent pipe 112. The feed counting system 100 employs a pellet counting algorithm (or "pellet tracker") that tracks in real time the amount of wasted feed that flows out of the tank 110 and through the effluent pipe 112, by differentiating between pellets 210, feces 220 and other elements (e.g., as shown in FIG. 2B). The feed counting system 100 can tie directly into an existing feeding system's API 310 to automatically update the amount of feed administered by a fish feeder machine 320 that is used by the feed counting system 100 (e.g., as shown in FIG. 3) in accordance with appetite of the fish in the tank 110 based on the uneaten feed determined by the pellet tracker (e.g., the count of uneaten feed pellets). The fish feeder machine 320, as is known by those skilled in the art, is a system that is employed by the fish farm to provide fish feed (i.e., pellets) to the fish at certain time intervals.

The computer 140, which may be referred to as a computing device, may be implemented as a single computing device (e.g., a desktop, laptop, or notepad), and includes a processor unit 144 (which may be referred to as having one or more processors or just a processor for ease of illustration), a display 146, an interface unit 148, input/output (I/O) hardware 150, a communication unit 152, a power unit 154, and a memory unit (also referred to as "data store") 156. The memory unit 156 may be a non-transient computer-readable medium which may be designed to have computer instructions stored thereon for use by the processor unit 144. In other embodiments, the computer 140 may have more or less components but generally function in a similar manner. For example, the computer 140 may be implemented using more than one computing device and/or processor unit 144. For example, the computer 140 may be implemented to function as a server or a server cluster.

The processor unit 144 controls the operation of the system 100 and may include one processor that can provide sufficient processing power depending on the configuration and operational requirements of the system 100. For example, the processor unit 144 may include a high performance processor or a GPU, in some cases. Alternatively, there may be a plurality of processors that are used by the processor unit 144, and these processors may function in parallel and perform certain functions.

The display 146 may be, but is not limited to, a computer monitor or an LCD display such as that for a tablet device or a desktop computer.

The interface unit 148 can be any interface that allows the processor unit 144 to communicate with other devices within the system 100. In some embodiments, the interface unit 148 may include at least one of a serial bus or a parallel bus, and a corresponding port such as a parallel port, a serial port, a USB port and/or a network port. For example, the network port can be used so that the processor unit 144 can communicate via the Internet, a Local Area Network (LAN), a Wide Area Network (WAN), a Metropolitan Area Network (MAN), a Wireless Local Area Network (WLAN), a Virtual Private Network (VPN), or a peer-to-peer network, either directly or through a modem, router, switch, hub or other routing or translation device.

The I/O hardware 150 can include, but is not limited to, at least one of a microphone, a speaker, a keyboard, a mouse, a touch pad, a display device and a printer, for example.

The power unit 154 can include one or more power supplies (not shown) connected to various components of the system 100 for providing power thereto as is commonly known to those skilled in the art.

The communication unit 152 includes various communication hardware for allowing the processor unit 144 to communicate with other devices. For example, the communication unit 152 includes at least one of a network adapter, such as an Ethernet or 802.11x adapter, a Bluetooth radio or other short range communication device, or a wireless transceiver for wireless communication, for example, according to CDMA, GSM, or GPRS protocol using standards such as IEEE 802.11a, 802.11b, 802.11g, or 802.11n.

The memory unit 156 stores program instructions for an operating system 158, a pellet tracker 159, a region of interest (ROI) proposal module 160, an ROI classification module 162, an ROI tracking module 164, a trajectory classification module 166 and data files 168. When any of the program instructions for the pellet tracker 159 or any of the modules 160 to 166 are executed by at least one processor of the processor unit 144 or a processor of another computing device, the at least one processor is configured for performing certain functions in accordance with the teachings herein. It should be noted that in alternative embodiments, the pellet tracker 159 and the modules 160 to 166 may be organized in other ways using different software programming structures as long as the same functionality is provided. The operating system 158 is able to select which physical processor is used to execute certain modules and other programs. For example, the operating system 158 is able to switch processes around to run on different parts of the physical hardware that is used, e.g., using different cores within a processor, or different processors on a multi-processor server, for example.

The pellet tracker 159 includes program instructions for performing pellet counting in real-time and generates feed data, such as the amount of uneaten feed pellets and/or any gradient fish feed data for sudden spikes in uneaten feed pellets, which are provided to the API 310 for generating a control signal to the fish feeder 320 for adjusting the amount of fish feed that is provided to the fish in the tank 110. The pellet tracker 159 calls the ROI proposal module 160, ROI classification module 162, ROI tracking module 164 and trajectory classification module 166 for performing certain operations during pellet tracking. The operation of the pellet tracker 159 is generally described with respect to FIG. 6A.

Alternatively, in at least one embodiment, the various modules may act as standalone programs that communicate via message passing, e.g., communicate in an event based fashion. For example, the ROI proposal module 160 may be communicatively coupled to the video feed, and when a new image frame is obtained the ROI proposal module 160 performs its processing. When the ROIs for an image frame are ready for further processing, the ROI classification module 162 is waiting to accept them. Similarly, the ROI classification module 162 is generating an event for the ROI tracker module 164, to notify the ROI tracker module 164 that there is data to process. This allows the software architecture to be scalable and distributed across many processors and/or computing device in a safe and scalable way.

The data files 168 may be used to store operational parameters, such as certain classifiers and other variables, that are used by the pellet tracker 159 and the modules 160 to 166. The data files 168 may also be used to store a history of the uneaten feed pellets that are determined by the feed tracker as well as other data, such as identified objects and trajectories, which may be used for quality control and/or further training of the algorithms that are used by the modules 160 to 166.

High Level Overview

At a high level, the pellet counting algorithm functionality can be decomposed into four discrete steps: region of interest (ROI) proposal, ROI classification, ROI tracking, and trajectory classification.

The ROI proposal module 160 reads in video frames and finds segments of each frame that roughly represent discrete objects. The ROI proposal module 160 uses computer vision techniques in an initial round of filtering to omit ROIs that are obviously not pellets to generate a set of proposed ROIs. The output of the ROI proposal module 160 includes the proposed ROIs, along with any necessary meta-data, which can be provided to the ROI classification module 162. The operations of the ROI proposal module 160 are generally described with respect to FIG. 6B.

The ROI classification module 162 is responsible for assigning each ROI, determined by the ROI proposal module 160, with a probability score of "pelletness" representing the probability that the ROI represents an object that is actually a feed pellet. To assign the pelletness score to each ROI, the ROI classification module 162 can use either a deep learning (DL) based technique such as, but not limited to, a convolutional neural network (CNN) that operates on the raw pixels of the ROI, or a more "classical" machine learning technique (such tree-based methods like extreme gradient boosted trees (XGB), support vector machine (SVM), etc.), for example, that operates using certain features (such as a pixel color distribution, edges that are found with Canny or Sobol edge detection, etc.) that are extracted in the ROI proposal module 160. The ROI classification module 162 may also be referred to more generally as a "classifier". The output of the ROI classification module 162 includes the pelletness scores of each ROI, along with any necessary meta-data, which can be provided to the ROI tracking module. The operation of the ROI classification module 162 is generally described with respect to FIG. 6C.

The ROI tracking module 164 uses a custom-designed tracking algorithm to determine and update trajectories of pellets by determining if an ROI, with its associated pelletness score, may be (1) added to a new trajectory, (2) added to an existing trajectory, or (3) ignored. Each trajectory contains the Cartesian coordinates and corresponding pelletness score of each ROI that comprises the trajectory. After the ROI tracking module 164 has made a decision for what to do with each ROI that appeared in a given frame, it will terminate any trajectories which have not been updated with a new ROI which are then added to one or more finished trajectories. The output of the ROI tracking module 164 includes the finished trajectories, which can be sent to the trajectory classification module 166. The operation of the ROI tracking module 164 is generally described with respect to FIGS. 6D and 6E.

The trajectory classification module 166 makes a final decision on whether or not a finished trajectory is counted as a pellet or non-pellet object. To do this, the trajectory classification module 166 may use data such as the length of the trajectory, the distribution of pelletness scores for the objects that make up the trajectory, and distributions of other ROI meta-data that are determined by the ROI proposal module 160. The trajectory classification module 166 can process the aforementioned data by using a probabilistic machine learning model, or simply with carefully selected threshold values and conditional rules to determine whether the finished trajectories correspond to a feed pellet or other object. The operation of the trajectory classification module 166 is generally described with respect to FIG. 6F.

Physical Setup for Data Collection

In order for the pellet counting algorithm to work effectively, a particular hardware setup, described below, achieves improved efficiency and accuracy.

The object enhancer 116 may be made of any material that creates a background for the feed camera 114. For example, the object enhancer 116 may be, but is not limited to, a high-density polyethylene sheet (HDPE) or a durable and translucent plastic made using other materials. This object enhancer 116 creates a high-contrast background, thus making any objects passing in between the feed camera 114 and the object enhancer 116 much more readily identifiable by the algorithms that are applied to image frames from the video feed. Preferably, the object enhancer has a consistent color and is translucent. For example, the color may be, but is not limited to white or a light color (e.g., to provide the high-contrast background).

FIG. 4A shows a perspective view of an example embodiment of the hardware setup 400 used in the effluent pipe 112. FIG. 4B shows a cross-sectional diagram of the example embodiment shown in FIG. 4A. The feed camera 114 may be connected to the underside of the object enhancer 116 such that the field of view of the feed camera 114 may capture the entirety, or a substantial portion, of the object enhancer 116 and also so that there is a fixed distance between the feed camera 114 and the lower surface of the object enhancer 116. For example, a bracket 408 can have upper ends that are attached to the lower surface of the object enhancer 116 and a middle portion connected to the upper ends via legs such that the feed camera 114 can be mounted on the middle portion and have its field of view directed towards the object enhancer 116. A second bracket 410, such as a U-shaped bracket, having posts 410p may be mounted to the effluent pipe 112 in such a manner that it restricts the ability of the object enhancer 116 and the feed camera 114 to rotate, but allows the object enhancer 116 and the feed camera 114 to rise and fall as the water pressure in the effluent pipe 112 changes causing water flow 460 to exit the effluent pipe 112. The bracket 408 and/or the second bracket 410 may be coupled to the effluent pipe 112 in other manners such that the bracket 408 and/or the second bracket 410 are adjacent to the effluent pipe 112 and maintain a position relative to the effluent pipe 112 to allow the feed camera 114 and the object enhancer 116 to maintain a fixed distance or, alternatively, vary in distance within a preset range. Alternatively, or in addition, the feed camera 114 may be connected to the bracket 408 or the second bracket 410. Alternatively, or in addition, the feed camera 114 may be connected to the effluent pipe 112. The feed camera 114 can have a wire 420 to connect it to a network connection (e.g., ethernet cable 118). Alternatively, the feed camera 114 can have a wireless connection to the ethernet switch 120.

For example, the bracket 410 may be mounted at an exit port or aperture of the effluent pipe 112 such that the object enhancer 116 is positioned above the exit port of the effluent pipe 112 and can move upwards thereby providing a gap between the bottom surface of the object enhancer 116 and the upper surface of the exit port to allow for water flow 460 to exit the effluent pipe 112 when there is an increase in water pressure in the effluent pipe 112. To accomplish this, the bracket 410 includes a sliding mechanism in the form of the posts 410p which are slidably engaged by grooves 116g that are at two portions of the edges of the object enhancer 116. When the water pressure decreases, the object enhancer 116 can move downwards. When the water pressure increases, the object enhancer 116 can move upwards. The result may be a configuration in which the feed camera 114 is secured to the effluent pipe 112 and the object enhancer 116 is slidably mounted adjacent to the effluent pipe 112 so that the object enhancer 116 can move up and down when different amounts of water flow exit the effluent pipe 112.

Although not shown, retaining elements may be used to prevent the object enhancer 116 from disengaging the posts 410p of the bracket 410 and floating away from the exit port of the effluent pipe 112. For example, end portions of the posts 410p may have a bulbous end or be flared outwards such that they engage the upper surface of the object enhancer 116 when the water flow 460 is strong enough to lift the object enhancer 116 to the top of the posts 410p and prevent the object enhancer 116 from disengaging from the mount (e.g., posts 410p of bracket 410) at the exit port of the effluent pipe 112.

Optionally, in at least one embodiment, a light 450 may be mounted so that it generates light that is directed to the object enhancer 116. In such cases, the light 450 may be secured to the bracket 410.

Together, the bracket 408, bracket 410, and posts 410p may be referred to as a bracket configuration or mounting assembly.

It should also be noted that in at least one embodiment, the bracket 410 includes lower horizontal members 410m1 and 410m2 that are adjacent to one another and moveable with respect to one another to allow for slidable enlargement or reduction of the width of the bracket configuration so that it may fit effluent pipes 112 having different diameters. Accordingly, the lower horizontal members 410m1 and 410m2 include channels that are aligned with one another that may receive a fastener to fasten the two horizontal members 410m1 and 410m2 together when they are positioned so that the upper lateral tabs of bracket 410, upon which the posts 401p are located, are positioned to overlap an upper edge of the side walls of the effluent pipe 112.

Figure 5:
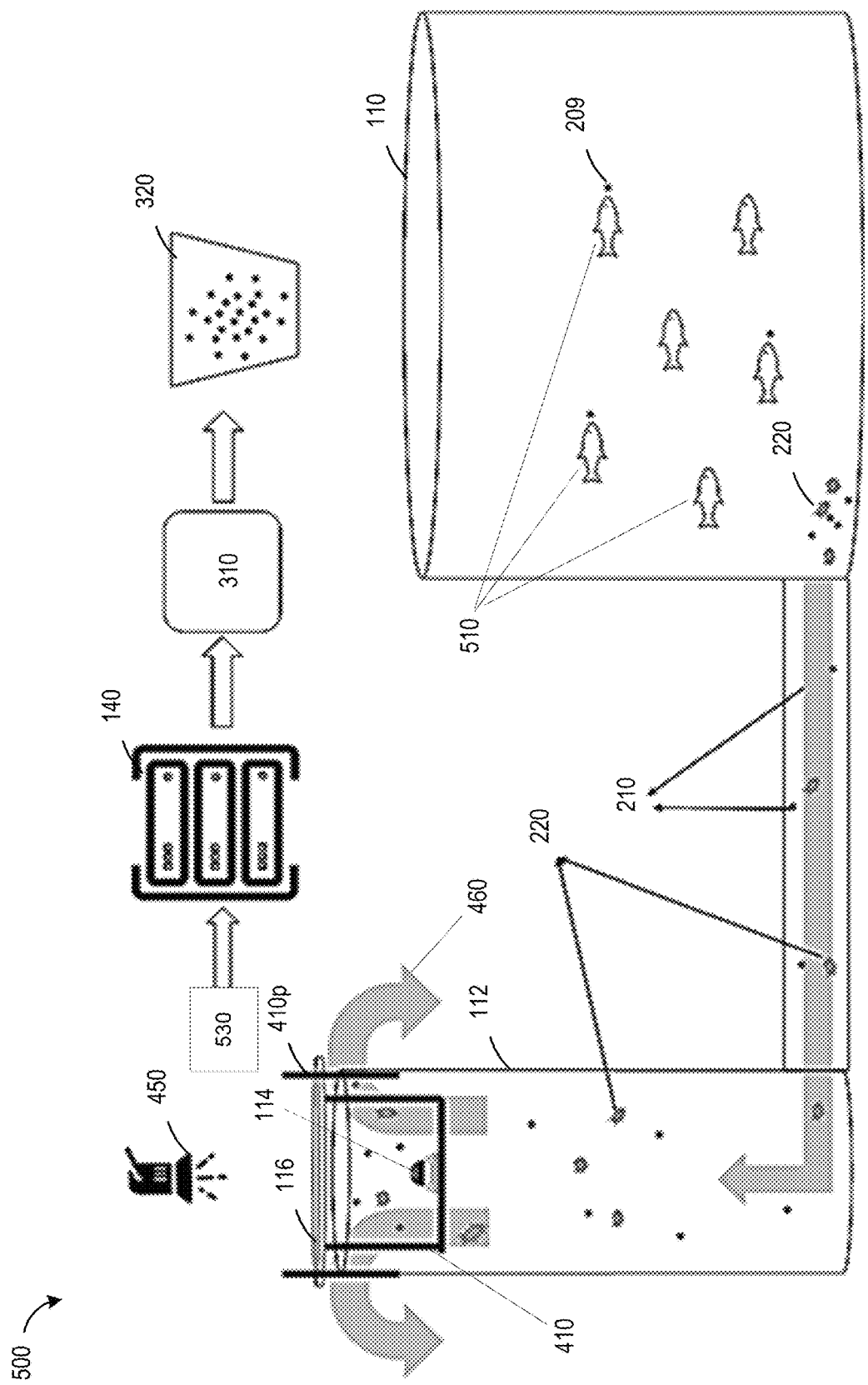
FIG. 5 shows a schematic diagram of the process flow of the system of FIG. 1.

FIG. 5 shows a schematic diagram of the example embodiment of the system 100 in its operating environment. The tank 110 has fish 510 in it that eat pellets 210. The fish 510 also excrete feces 220. Any uneaten feed pellets 210 as well as the feces 220 exit the tank 110 through the effluent pipe 112. These discrete objects (the uneaten feed pellets 210 and feces 220) move towards the object enhancer 116 due to the water pressure and water flow 460. The object enhancer 116 floats on top of the water, and moveably engages the posts 410p of the pipe bracket 410 so as to avoid blocking the water flow 460. The feed camera 114 is pointed towards the object enhancer 116, which is translucent or transparent, with a light 450 illuminating the object enhancer 116. In at least one implementation, the light 450 illuminates the object enhancer 116 only when ambient lighting in the operating environment is insufficient to allow for objects (e.g., the uneaten feed pellets 210, the feces 220 and other elements) from being captured in the image frames of the video feed 530 obtained by the feed camera 114. The feed camera 114 provides the video feed 530, via a communication link, such as the ethernet cable 118 or in at least one embodiment wirelessly in which case the feed camera 114 includes a transceiver (not shown), to the computer 140. The computer 140 operates the pellet tracker 159 which counts the uneaten feed pellets and provides a data output, such as a pellet count, to the fish feeder machine 320. In at least one embodiment, the computer 140 may provide the pellet count and, optionally any excessive gradients in uneaten feed pellets, to an operator of the fish farm for future use or for tracking purposes. The computer 140 may produce this output using the various modules described below.

Figures 6A, 6B:
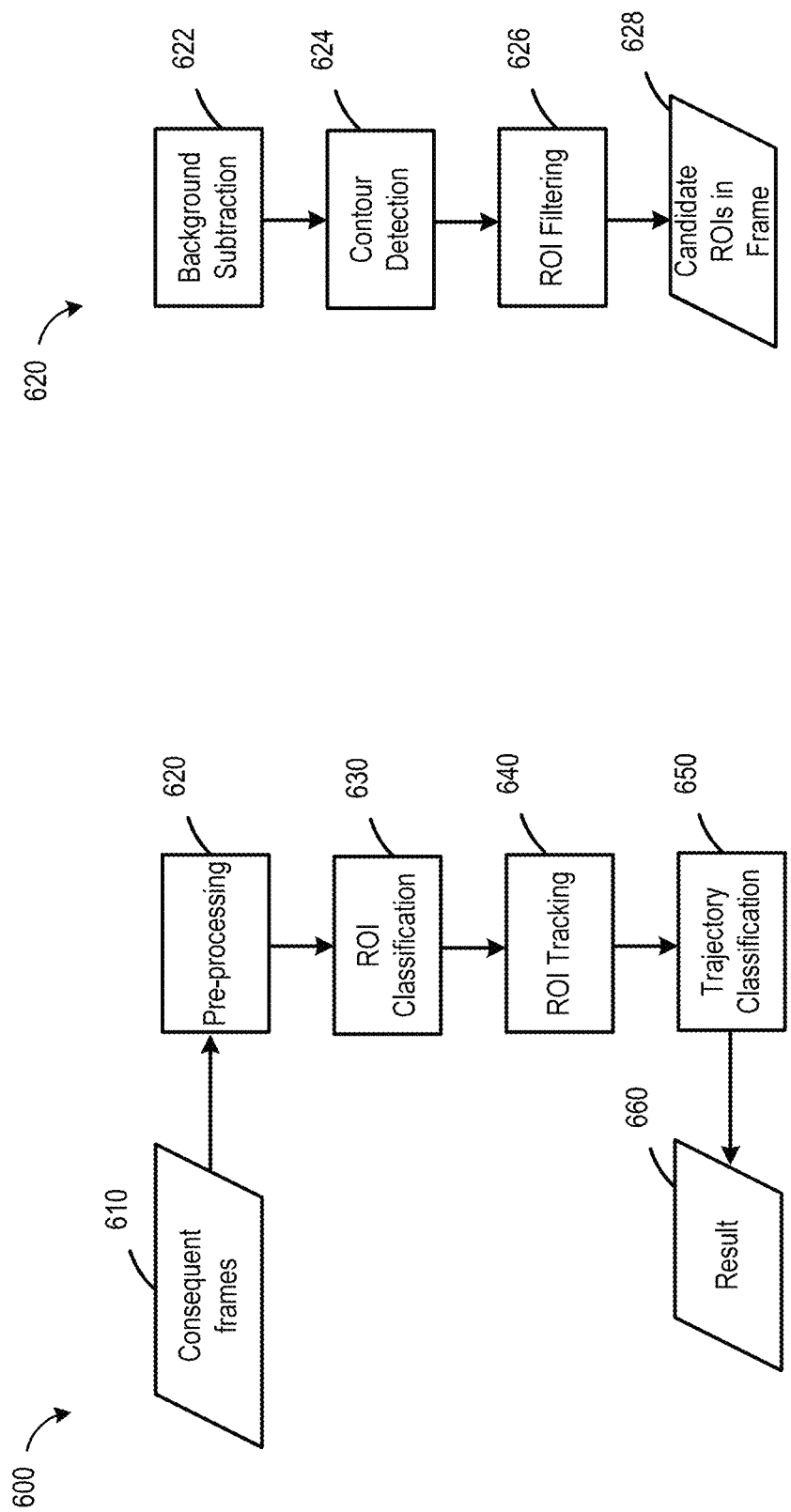
FIGS. 6A-6F show flow charts of an example embodiment of a method used by the system of FIG. 1 to automatically determine fish uneaten fish feed (i.e., uneaten feed pellets).

FIG. 6A shows a flow chart of an example embodiment of a pellet counting algorithm 600 that may be implemented by the pellet tracker 159 for use by the system 100.

At 610, the computer 140 obtains consequent image frames from the video feed 530 that is obtained by the feed camera 114. For example, the computer 140 obtains the image frames in the order in which they were acquired by the feed camera 114, for example, at a predefined frame rate. In at least one implementation, the feed camera 114 uses a frame rate of 25 frames per second—if the frame rate is too low, the distance that an object travels in between frames may be too large for accurate object tracking. The image frames can be stored in the data store 156. It should be understood that each image frame contains data representing what was in the field of view of the feed camera 114 when the frame was acquired.

At 620, the computer 140 pre-processes the image frames using the ROI proposal module 160 to obtain proposed ROIs and any associated meta-data (such as a unique identifier for the feed camera 114 that they came from). The proposed ROIs and the meta-data are provided to the ROI classification module 162 via a messaging tool such as, but not limited to, Redis or Apache Kafka. The messaging tool used can, for example, facilitate transfer of data between the different modules when each module is performed on different processors or different computing devices in a cluster. The operation of the ROI proposal module 160 is described in more detail with respect to FIG. 6B.

At 630, the computer 140 performs ROI classification using the ROI classification module 162 to obtain pelletness scores for each ROI along with any associated meta-data. The meta-data may be, for example, a unique ID that tells one or more of the downstream modules what camera the ROIs came from and the timestamps that uniquely identify each frame. The pelletness scores and the meta-data are provided to the tracking module 164, again via a messaging tool. The operation of the ROI classification module 162 is described in more detail with respect to FIG. 6C.

At 640, the computer 140 performs ROI tracking by using the ROI tracking module 164 on the ROIs, the associated pelletness scores and any applicable meta-data. The ROI tracking module 164 generates new trajectories, updates trajectories and/or determines finished trajectories (trajectories that cannot be updated). The output of the ROI trajectory module 164 is the finished trajectories. The operation of the ROI tracking module 164 is described in more detail with respect to FIGS. 6D and 6E.

At 650, the computer 140 performs trajectory classification on the finished trajectories using the trajectory classification module 166. The output of the trajectory classification module 166 is whether finished trajectories are counted as a pellet or non-pellet object. The operation of the trajectory classification module 166 is described in more detail with respect to FIG. 6F.

At 660, the result of the trajectory classification is processed in order to determine data that may be provided to and acted upon by the fish farm. For example, the results of the trajectory classification can be processed at 660 so that the amount of uneaten feed pellets over certain time intervals, such as about 1 min, 5 min, 10 min, 15 min or more or if there are any large gradients in uneaten feed pellets, are provided to the API 310 or to the feeder machine 320 directly which then act to control the amount of fish feed that is provided by the feeder machine 320 to the fish in the tank 110. In at least one implementation, the time interval can be preprogrammed. Alternatively, in at least one implementation the time interval can be modified during use, such as based on input provided by an end user via the API 310.

In at least one embodiment, the pellet counting algorithm 600 determines the number of wasted pellets passing through the field of view of the feed camera 114 as a predetermined percentage (e.g., 10%, 15%, 20% or another percentage) of the total number of wasted pellets exiting through the effluent pipe 112. This predetermined percentage may be established in various ways, such as by selecting a field of view and/or size of the object enhancer 116 that results in a known ratio of objects passing through the field of view of the feed camera 114 compared to the total number of objects exiting through the effluent pipe 112 wherein the counted objects and the total number of objects are the uneaten food pellets. Alternatively, or in addition thereto, this predetermined percentage may be verified by measurement, such as by measuring/counting the number objects passing through the field of view of the feed camera 114 and using a net/container to collect all of the objects exiting through the effluent pipe 112 and then counting the objects in the net/container. This predetermined percentage then provides a scale factor (e.g., 10 in the case of the predetermined percentage being 10%, or 5 in the case of the verified percentage being 20% or other scale factors depending on the actual physical setup of the feed camera, object enhancer and the effluent pipe) that can be used to extrapolate the total number of wasted pellets exiting through the effluent pipe 112.

Alternatively, in at least one implementation, the computer 140 provides the result of the trajectory classification to a back-end service, that may be part of the system 100 that manages a database, displays results to an end user, and integrates with the API 310 using a framework of rules that can be updated by the end user. For example, such an update rule might be "if the number of pellets counted in the last 10 minutes was less than a certain number, increase the feed rate by 5%, but if it was greater than that number, decrease it 5%." In some implementations, the percent change to the feed rate may be variable depending on how far away the number of counted pellets is from the ideal number of wasted pellets (i.e., a setpoint).

ROI Proposal Module Details

FIG. 6B shows a flow chart of an example embodiment of a method for performing the pre-processing 620 done by the ROI proposal module 160. The ROI proposal module 160 operates in an environment where, because of the object enhancer 116, the only pixels that will change in any significant way between two consecutive image frames potentially represent a wasted feed pellet or other moving object. This characteristic of the environment is used to identify regions (e.g., regions of interest—ROIs) of each image frame that warrant further consideration.

At 622, the computer 140 performs background subtraction. The techniques used to perform background subtraction are ones that can identify objects which may be moving between subsequent frames. For example, upon reading in a new image frame, the ROI proposal module 160 may use a background subtraction algorithm such as, but not limited to, a K-Nearest Neighbors (KNN) based algorithm, to generate a binary pixel mask for the new image frame. In this mask, pixels with a value of zero are considered to be part of a non-moving background, and pixels with a value of one are part of a moving foreground and such pixels may be related to moving objects.

At 624, the computer 140 performs contour detection in order to determine potential ROIs. For example, the ROI proposal module 160 uses a contour detection algorithm to extract the boundaries of each "island" of foreground pixels in the binary pixel mask. The contour detection algorithm may be, for example, may be implemented using various suitable techniques including, but not limited to: a pixel following, a vertex following, or a run-data-based following technique. An example of a pixel-following contour detection algorithm that may be used is the findContours method provided by the OpenCV library. By finding the minimum and maximum points of each contour in both the x and y directions, the ROI proposal module 160 can define a bounding box around each foreground object. The contents of these bounding boxes in the original image are referred to as ROIs.

In practice, there are many patches of changing pixels in a given image that do not correspond to feed pellets. Such patches of pixels may represent other objects, like fecal matter, bubbles, or a moving piece of equipment, but oftentimes also come from visual artifacts like the shimmering of a water/air interface. To prevent wasting computational resources, the ROI proposal module 160 may be configured to remove non-pellet ROIs before sending them on for additional processing by performing filtering at 626.

At 626, the computer 140 does ROI filtering 626 to identify and remove any ROIs that do not correspond to feed pellets. For example, (1) one or more computer-vision-based filters may be used to extract features from each ROI and (2) these features can then be compared to empirically determined thresholds to decide which ROIs may be omitted based on the aforementioned features. An example of a filter that can be used includes, but is not limited to, a minimum contour size requirement to filter out ROIs that correspond to objects and artifacts that are too small to be feed pellets. Alternatively, another type of filter can be based on shape requirements, such as a circularity measure or an aspect ratio.

Alternatively, a more complex set of specially designed filters can be effective in removing particular types of unwanted objects such as bubbles and water shimmering artifacts. One approach is to compare the intensities of the pixels inside the contours and outside the contours of an ROI. The pixels inside a contour outlining a feed pellet are expected to be darker than the surrounding pixels. In contrast, contours that outline water artifacts and bubbles generally do not meet this assumption.

Yet another ROI filtering method that may be used is based on comparative measures between a contour and its "enhanced contour" counterpart. In contrast with the ROI contours that are generated from the foreground masks (e.g., the output of background subtraction), in at least one embodiment, the ROI proposal module 160 may generate "enhanced contours" by performing thresholding on the original image to obtain a second estimate of where the boundary of the object is. This thresholding may, for example, use the object's property of being dark colored and the property of the object enhancer 116 being light colored to find the boundary of the object. The shape of the two different types of contours obtained in the first and second estimates is similar for feed pellets but drastically different for bubbles, water artifacts, and other objects with irregular edges and extrusions (such as fecal matter). Accordingly, shape measures can be obtained for contours for objects that correspond to one another (e.g., represent the same underlying object) from the first and second estimates and if the difference in the shape measures is below a shape measure threshold level then it is more likely that those ROIs are for the same object (e.g., a feed pellet) and can be retained while the other ROIs that have a difference in shape measures which is greater than the shape measure threshold can be removed.

While these filtering methods may be insufficient for identifying pellet ROIs with a high degree of accuracy and do not provide a "pelletness" probability, they do help with removing a significant proportion of non-feed-pellet ROIs. Removing these non-feed-pellet ROIs at this stage significantly improves the downstream computational efficiency of the pellet counting algorithm overall.

In at least one embodiment, multiple filters may be used in a serial manner for removing non-feed-pellet ROIs. For example, a first filter stage can be based on a first feature that is measured from the candidate ROIs and each ROI that is not filtered out is provided to a second filter stage that is based on a second measure or enhanced contour filtering and so on and so forth for potentially additional filter stages.

Moreover, in at least one embodiment, ROI filters can be used to identify when something is wrong with the physical setup in the effluent pipe (e.g., the hardware setup in FIGS. 4A and 4B), and notify the end user when, for example, an abnormal quantity of bubbles are present based on using a filter that can identify bubbles.

At 628, the computer 140 determines a set of candidate ROIs in a given image frame that is being processed based on the ROIs that are not filtered out during 626. The computer 140 may also generate meta-data, such as a unique identifier of the feed camera 114 and a timestamp that uniquely identifies each of the image frames that are acquired by the feed camera 114.

ROI Classification Module Details

Figure 6D:
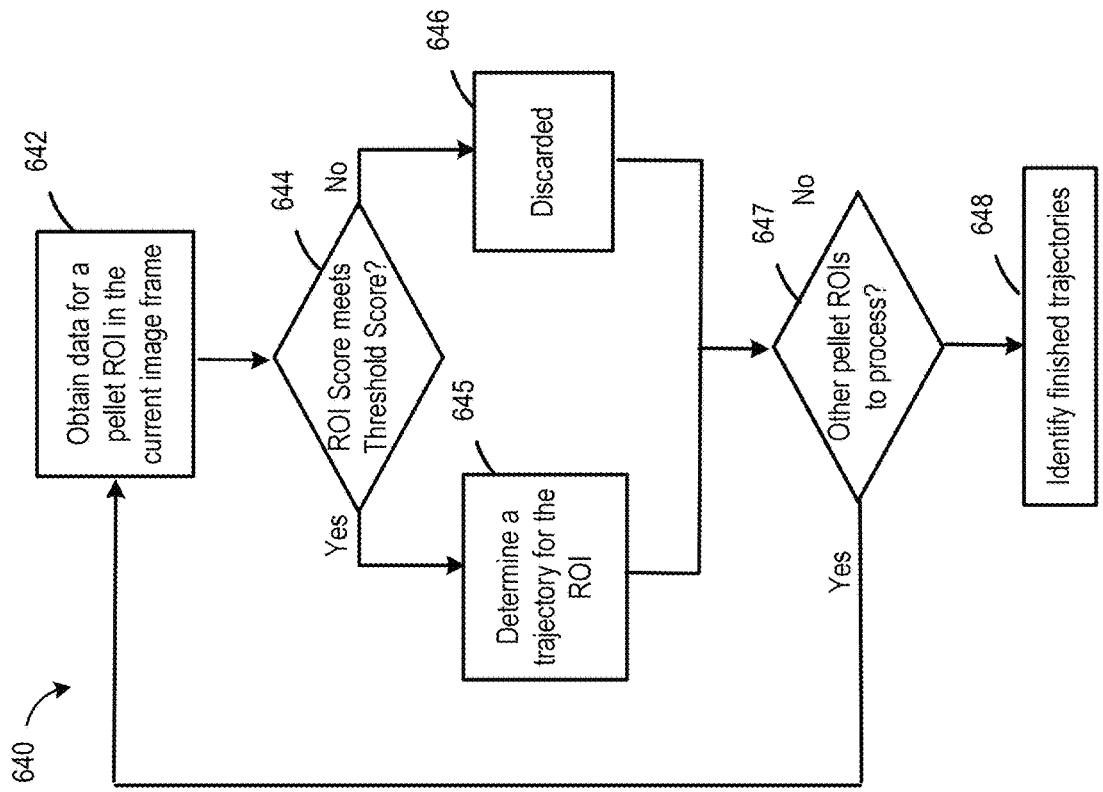
Figure 6C:
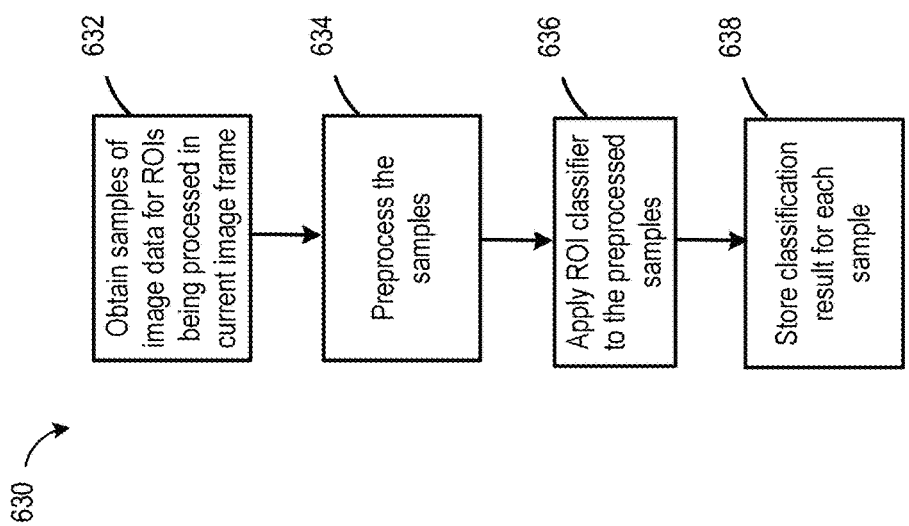

FIG. 6C shows a flow chart of an example embodiment of an ROI classification method 630 that can be performed by the ROI classification module 162. The main goal of the ROI classification module 162 is to assign each ROI a probability of that ROI being a pellet (the "pelletness" score). While there are several ways that method 630 can be implemented, it is preferable to obtain the pelletness score using a convolutional neural network (CNN).

Many classifiers based on CNN models achieve impressive results on complex datasets. However, due to the nature of the pellet or not pellet binary classification task, it is favorable to use a comparatively less complex CNN model so as to prevent overfitting as well as a needlessly large computational footprint. One possible implementation for the ROI classifier is using the MobileNet v2 model with the alpha parameter set to 0.25 as a feature extraction network followed by a densely connected layer with 64 hidden units with an ReLU activation function, and a final densely connected layer with three output nodes and a softmax activation function. However, it should be noted that in alternative implementations other classifiers can be used.

Before inputting samples (e.g., each sample corresponds to a given ROI from a current image frame that is being processed and includes the image data in the ROI from that image frame) into the ROI classifier for training or inference, preprocessing is performed on the ROIs so that they are reshaped to be 64×64 pixels in size and also undergo mean-centering normalization. These 64×64 RGB image input datasets are the only inputs to the ROI classifier. During training, random augmentations in the form of rotations, and horizontal/vertical flips are used. Since the neural network is meant only to recognize full pellets, augmentations that may prevent the entire pellet from being shown (e.g., random cropping or shearing) are not used. Pre-trained weights also may not be used (i.e., no transfer learning).

A common issue with neural networks is that they have poor calibration, meaning they tend to only make confident predictions. This is an undesirable quality due to the fact that, when a given CNN model makes an incorrect decision, it does so with high confidence. In the distribution of images in the production environment from which datasets are obtained for processing by the ROI classifier, there are many objects for which even a human labeler lacks confidence in their decision of whether or not a sample is a pellet or non-pellet object. In such cases, it is desirable for the pellet classification model to generate a probability that reflects this uncertainty (i.e., a probability closer to 0.5 than to 0 or 1).

To alleviate the issue of poor model calibration, it is helpful to construct the training data set with objects that are in three classes: pellet, non-pellet, and ambiguous. Human labelers were instructed to label ROIs provided by the ROI proposal module 160 as one of these three classes, and to use the ambiguous class whenever they were not completely confident in their prediction of pellet/non-pellet.

One key difference between the way the human labelers and the CNN view the ROI data is that humans have access to contextual information from the surrounding (e.g., previous and subsequent) image frames. When uncertain about whether or not an ROI may be labeled as a pellet, humans are able to look at both the preceding and succeeding frames to aid in their decision. In such cases where an ROI was obviously a pellet due to information from surrounding frames (such as the way it looked in a previous frame, or the way it moves between frames), but it was less clear what the pellet is when just viewing the object from an individual frame, labelers were instructed to try to forget about their contextual information and still use the ambiguous label.

The addition of the ambiguous class improved the meaningfulness of the probability distribution that the ROI classifier outputted for each sample. Here, the sample is just one object, and the probability distribution is defined as the probabilities that this object is (a) a pellet, (b) a non-pellet, and (c) ambiguous, where the sum of these three probabilities equals 1 (i.e., it is a softmax distribution). In some scenarios, a genuine pellet trajectory can have one ROI in the middle that slightly overlaps with a non-pellet object (e.g., a bubble or piece of fecal matter) and this would cause that ROI to be assigned a pelletness score of 0.0, which would cause that ROI to be omitted by the tracker. By adopting this method, the classification model may still give that ROI a low score, but not so low as for it to be ignored by the tracker. Adopting this technique also improved the ability for the trajectory classification module 166 to effectively separate pellet and non-pellet object trajectories.

To achieve adequate performance, at least 5000 samples for each class may be used to train the ROI classification model. These samples may come from as many scenarios (e.g., different lighting conditions or effluent pipe flow rates) as possible. Fine tuning of the classification model may be required when moving to new environments.

At 632, the computer 140 obtains the current image frame being processed and the coordinates for the ROIs. Samples are obtained that represent the image data for each ROI. At 634, the samples are preprocessed which may be done as explained earlier by performing reshaping and mean-centering normalization on each ROI so that they are each represented by matrices having the same size.

At 636, each preprocessed sample is applied to the ROI classifier which generates a probability distribution for each sample. The ROI classifier may be a CNN-based classifier as described previously. This may be a discrete probability distribution, such as SoftMax distribution. For example, for each sample, the probability distribution includes probability scores that sum to one and represent the chance that the underlying object belongs to one of the classes used by the ROI classifier. The probability distribution for a given sample then includes a first probability that the object corresponding to the sample is a pellet, a second probability that this object is a non-pellet, and a third probability that the object is ambiguous. For example, the CNN classifier may provide a probability distribution for a given sample as 0.8 for the pellet class, 0.15 for the ambiguous class, and 0.05 for the non-pellet class.

At 638, the highest probability for each sample is used to label the ROI for the object that corresponds to the sample as either a pellet, a non-pellet or ambiguous. Data files 168 or a database may be updated to keep track of the classifications for each ROI that is processed by the ROI classification module 164.

ROI Tracking Module Details

FIG. 6D shows a flow chart of an example embodiment of an ROI tracking method 640 that can be performed by the ROI tracking module 164 based on the ROIs that have been classified as being pellets. Since the goal is to count pellets, and pellets exist in multiple image frames of a video feed, the pellet tracker 159 may track each pellet that is identified to avoid counting them multiple times across successive image frames.

Many open-source implementations of tracking algorithms, like those from OpenCV, are insufficient or ineffective. Typically, these algorithms are initialized with image patches (e.g., ROIs) and operate by looking for a similar image patch in the next image (e.g., next frame in a video). Because these methods operate on image patches, they are computationally intractable at the scale of modern land-based fish farms. Also, they do not give the opportunity to use a pelletness score when deciding whether or not to add an ROI to an existing trajectory.

However, in accordance with the teachings herein, rather than using image patches, the pellet counting algorithm operates using pelletness scores and the coordinates of the centroid of each ROI. In general, the pelletness score is used to determine if an ROI is worth tracking, and if so, to determine whether to: (1) start a new trajectory with the current ROI being processed; or (2) add the ROI to an existing trajectory.

At 642, the ROI tracking module 164 receives the ROI data from a single image frame for a given ROI that has been classified as pellets (i.e., "pellet ROIs"). This ROI data can include the location of the ROI (e.g., the coordinates for the ROI) and the "pelletness ROI score" which is the probability determined by the ROI classification module 162 that the ROIs correspond to a pellet. This ROI data may also include meta-data, such an identifier for the feed camera 114 and a timestamp representing the time that the image frame that is currently being processed was acquired.

At 644, the computer 140 determines whether the ROI score meets a threshold score which is another check, after the classification performed by the ROI classifier, that the ROI is more likely to be a pellet than belong to another class. If this comparison is true (i.e., Yes, the ROI score meets the threshold score), then the ROI can be referred to as a candidate ROI and the method 640 proceeds to 645.

If the comparison at 644 is false (i.e., No, the ROI score does not meet the threshold score), then the method 640 proceeds to 646 at which point the object is discarded and no longer tracked. The threshold score can be determined empirically.

At 645, the computer 140 determines which trajectory to include the candidate ROI in, which may involve comparing the location of the object corresponding to the ROI pellet and the trajectories that are currently being tracked. For example, when the distance between the candidate ROI being assessed and the "tail" (e.g., the last ROI) of an existing trajectory that is nearest to the candidate ROI being assessed is larger than a predetermined distance threshold (in terms of Euclidean distance for example) then a new trajectory with the current can be started using the current ROI being assessed as the starting point. Alternatively, if the aforementioned distance is less than the distance threshold, then the ROI tracking module 164 adds the current ROI being assessed to that existing closest trajectory. The assessment at 646 may be done using method 700 in FIG. 6E, for example.

At 647, it is determined whether there are other ROIs to assess for the current image frame. If there are more ROIs to assess the method 600 returns to 642.

If all of the ROIs have been processed for the current image, then the method 640 proceeds to 648 where the ROI tracking module 164 determines whether any trajectories that existed before the current image frame that is being processed were not updated with any of the ROIs in the current image frame. Each of these trajectories are referred to as a "finished trajectory". The ROI tracking module 164 identifies any finished trajectories which can then be provided to the trajectory classification module 166.

Figure 6E:
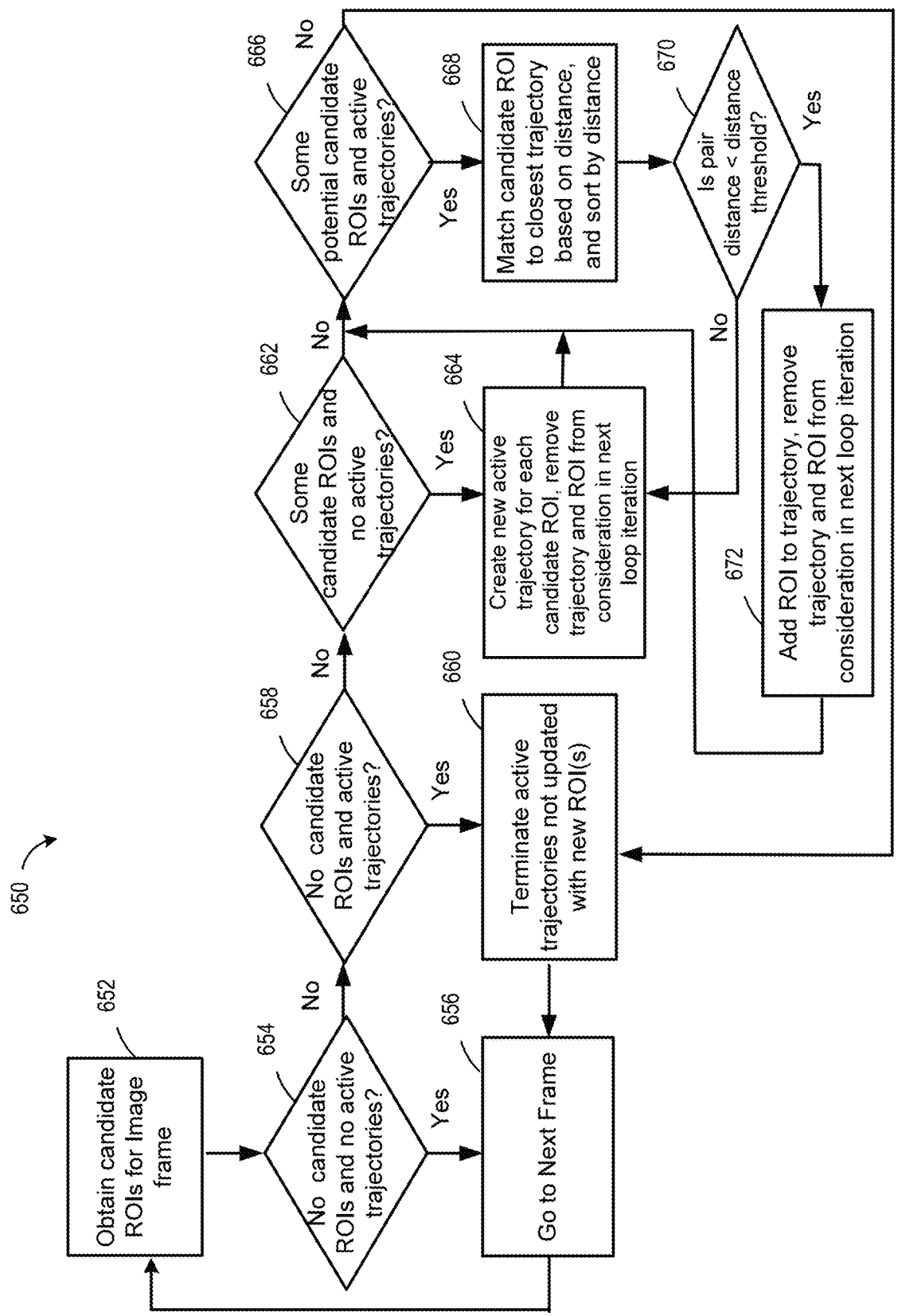

FIG. 6E shows a flow chart of an example embodiment of a method 650 for assigning ROIs to an existing trajectory or to a new trajectory. The method 650 may be performed by the ROI tracking module 164 when it is executed by the computer 140. In this example embodiment, the method 650 is implemented as a batch processing method which can operate on all ROIs that were not discarded based on the ROI pelletness scores as described previously with respect to FIG. 6D in a current image frame as well as process several image frames successively. In at least one implementation, the method 650 is performed by the computer 140 on a per-image frame basis, where the computer 140 receives as inputs all ROIs that were found in a particular image frame.

At 652, the computer 140 obtains the candidate ROIs and pelletness scores for the current image frame. At 654 it is determined if there are not any candidate ROIs. If this determination is true, the method 650 proceeds to 656 where the next image frame may be loaded and then the method 650 returns to 652 where data about the candidate ROIs for that next image frame are obtained. Alternatively, if the determination at 654 is false then the method 650 proceeds to 658.

At 658 it is determined whether there are no candidate ROIs and whether there are active trajectories. If this determination is true, then it means that there are no ROIs to add to active trajectories in which case the method 650 proceeds to 660. If the determination at 658 is false, then the method 650 proceeds to 662.

At 660, the active trajectories are terminated and can then be identified as finished trajectories. An active trajectory is one in which an ROI was added to it in a previous image frame. At this point the method 650 can proceed to 656 to process candidate ROIs for the next image frame or the method 650 can end (not shown).

At 662, it is determined whether there are candidate ROIs and no active trajectories. If this determination is true, then it means that there are no active trajectories to add the candidate ROIs to and that they can be added to new trajectories in which case the method 650 proceeds to 664. If the determination at 662 is false, then the method 650 proceeds to 666.

At 664, a new active trajectory is created for each candidate ROI where the candidate ROI is the starting node or object for the new trajectory. At this point the method 650 can proceed to 666 to process candidate ROIs for the next image frame or the method 650 can end (not shown).

At 666, the situation is that at first there are some (i.e., at least one) candidate ROIs and at least one active trajectory. As the method 650 iterates over 666, 668, 670, and 672, then each time 666 is performed it is determined whether there is a candidate ROI that needs to be assessed. If this determination is true, then the method 650 proceeds to 668. If this determination is false, then the method 650 proceeds to 660.

At 668, the method 650 involves determining whether the candidate ROIs belong to an active trajectory or if one or more new active trajectories are to be created. This can be determined by locating the candidate ROIs that match or correspond with an active trajectory based on comparing the distance of the candidate ROI to the active trajectory to a distance threshold. This may be done by determining pair distances for the distance (e.g., Euclidean) from the location (e.g., centroid) of a current candidate ROI and the tail location (e.g., the location of the most recently added ROI) of the active trajectories and determining the smallest pair distance.

The method 650 then proceeds to 670 where the smallest pair distance for each candidate ROI to a corresponding closest active trajectory is compared to a distance threshold. If the pair distance is smaller than the distance threshold then the method 650 proceeds to 672.

At 672, the candidate ROI is added to the closest active trajectory. The candidate ROI and its closest active trajectory are then removed from consideration and the method 650 moves to 666 to determine whether there are any other candidate ROIs that need to be assessed.

If the determination at 670 is false, then the method 650 proceeds to 664 at which point a new trajectory is created for the current candidate ROI. The method 650 then proceeds to 666 to determine if there are further candidate ROIs to assess. Before the method 650 proceeds to 666, the computer 140 removes the last created trajectory and ROI from consideration in the next loop iteration. If there are no other candidate ROIs to assess then the method 650 proceeds to 660.

Trajectory Classification Module Details

Figure 6F:
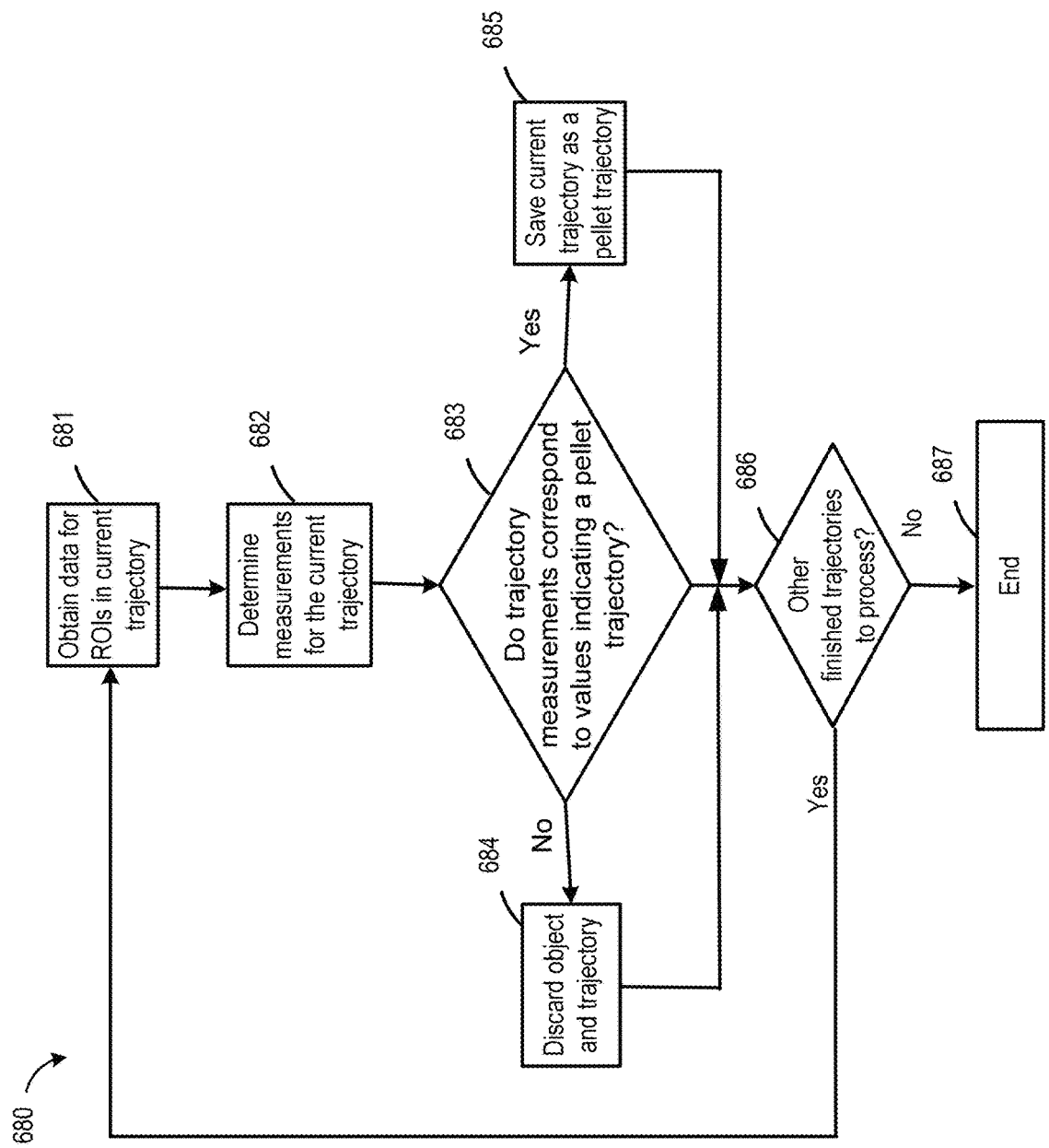

FIG. 6F shows a flow chart of an example embodiment of a trajectory classification method 680 that may be performed by the trajectory classification module 166 when it is executed by the computer 140. In at least one embodiment, method 680 is performed every time a trajectory goes from the "active" to the "finished" state. In an alternative implementation, method 680 is performed over a subset of possible trajectories to reduce processing requirements.

Every ROI with a sufficiently high pelletness score at this point is part of a trajectory, but not all of these trajectories are necessarily pellets. Because individual objects can appear significantly different in different image frames, an object may look more like a pellet in one or more image frames and more like a non-pellet object in one or more other image frames. By considering the properties of the entire trajectory such as, but not limited to, the length of the trajectory, the distribution of pelletness scores for the ROIs of the object that is being tracked in the trajectory and at least one measure (e.g., mean, standard deviation, certain percentiles, etc.) of the statistical distributions of one or more other filter values, the trajectory classification module 166 is able to make a final classification of each trajectory as being a trajectory that is most likely associated with a pellet or with a non-pellet object.

At 681, the method involves obtaining the data for ROIs in a current trajectory. At 682, trajectory measurements are made based on the ROIs in the current trajectory including the length of the trajectory, the distribution of pelletness scores for the ROIs in the trajectory and/or the at least one measure of the statistical distributions of one or more other filter values. In at least one embodiment, only the mean of the pelletness scores is used. Alternatively, in at least one embodiment, the mean as well as the 25th/50th/75th percentiles are used, which may result in a much clearer picture of the trajectory as seen by the pellet classification model.

At 683, the trajectory measurements are assessed to determine whether the trajectories from which they were obtained can be classified as a pellet trajectory. In at least one embodiment, this assessment may be done by providing the trajectory measurements to a trajectory classifier which then provides a probability that the trajectory belongs to a pellet trajectory class or a non-pellet trajectory class. This could be done with a linear model such as logistic regression or a tree based model such as a random forest or XGBoost. Alternatively, in at least one embodiment, this assessment may be done by comparing the at least one trajectory measurement to corresponding trajectory measurement thresholds that have been determined using empirical data. In such embodiments, if there are more trajectory measurements that pass the trajectory measurement thresholds then this indicates that the current trajectory is most likely that of an uneaten feed pellet and the method proceeds to 685 where the trajectory is classified as a pellet trajectory. The method 680 then proceeds to 686.

If the determination at 683 is false, then the method 680 proceeds to 684 where the trajectory and the corresponding the ROIs for the corresponding object are discarded. The method 680 then proceeds to 686.

At 686 it is determined whether there are other trajectories to classify. If this determination is true, the method 680 returns to 681. If this determination is not true, then the method 680 proceeds to 687 and ends.

In at least one embodiment, method 600, or a subset thereof, further comprises mounting the object enhancer 116 adjacent an outlet of the effluent pipe 112 opposite to and in the field of view of the feed camera 114 to provide a background for the feed camera 114 so that the objects in the acquired images have a definable perimeter; and securing the feed camera 114 to the object enhancer 116 so that the video feed obtained by the feed camera 114 comprises image frames that are images of the object enhancer 116 and include objects that traverse the field of view of the feed camera 114 when the images are acquired.

In at least one embodiment, the system 100 for feed monitoring in a land-based fish farm having a tank 110 containing fish comprises: the feed camera 114 mounted to the effluent pipe 114 that is coupled to the tank 110, the feed camera 114 being configured to capture a video feed comprising images of objects that traverse a field of view of the feed camera 114 when each image is acquired, the objects comprising pellets and non-pellet objects; and the computer 140 comprising the processor unit 144 and the memory unit 156 having stored thereon instructions that when executed cause the processor unit 144 to perform the method 600, or a subset of method 600.

Figure 7A:
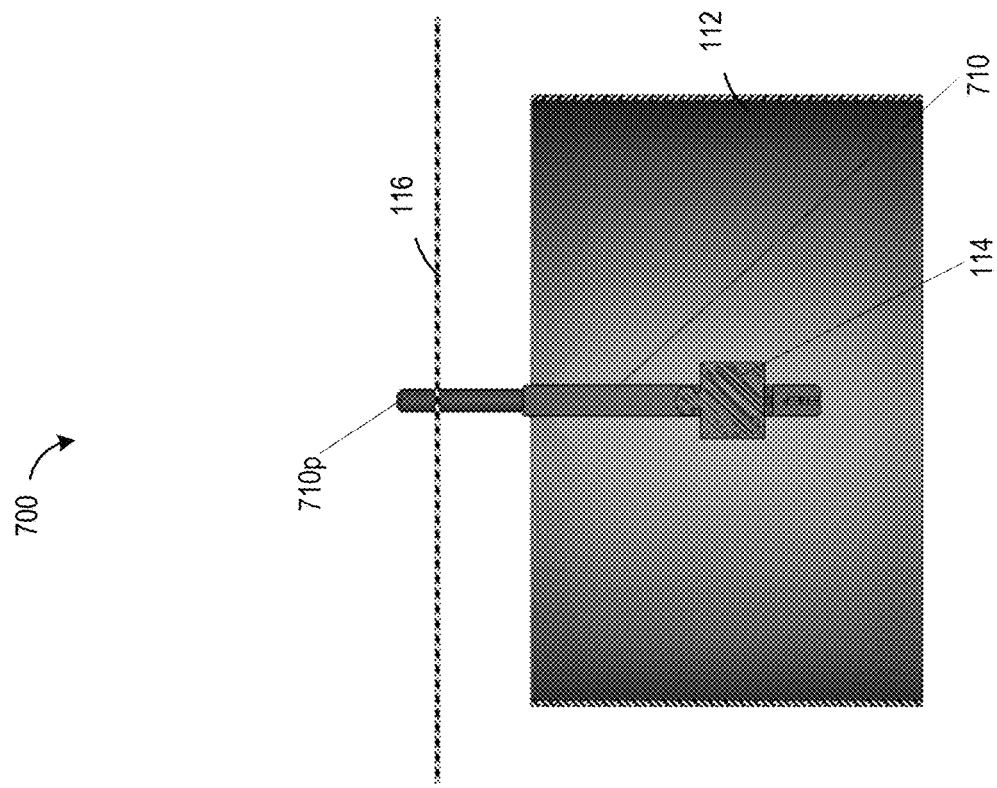
FIGS. 7A and 7B show perspective and side cross-sectional views of another example embodiment bracket configuration (e.g., mounting assembly) that is expandable and securable at a portion of an effluent pipe where the bracket configuration is coupled to the background enhancer of FIG. 2A.
Figure 7B:
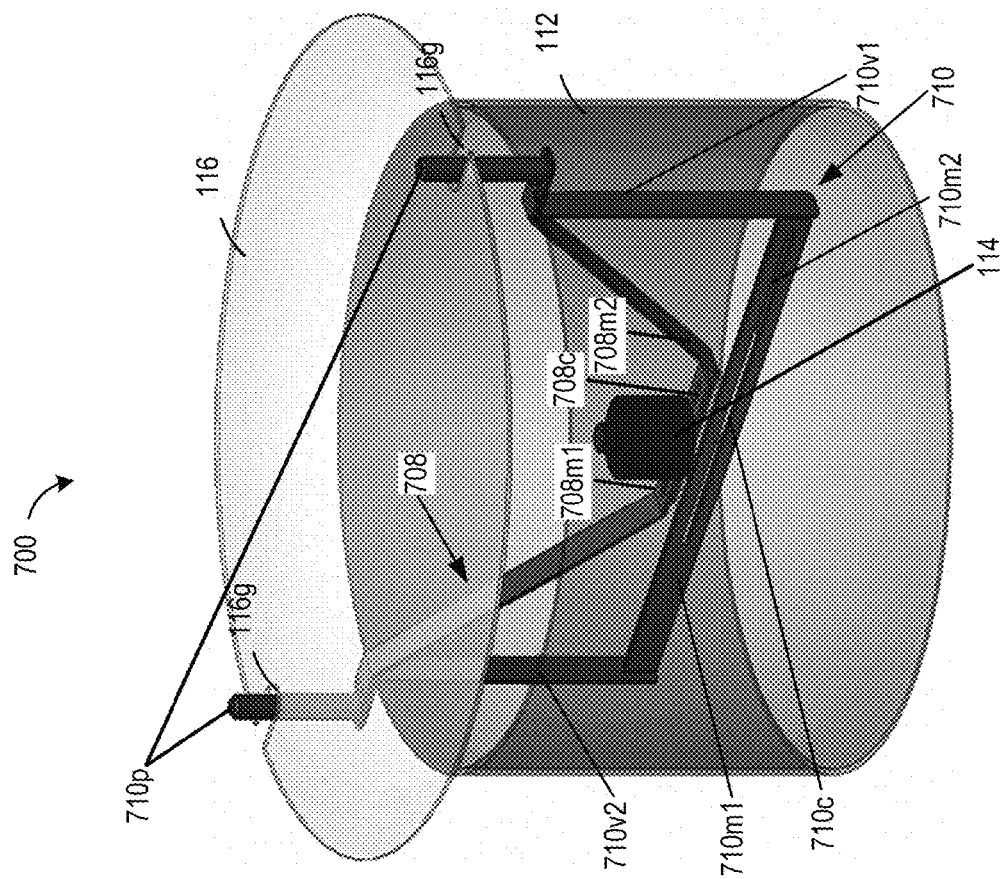

FIG. 7A shows a perspective view of an example embodiment of the hardware setup 700 used in the effluent pipe 112. FIG. 7B shows a cross-sectional diagram of the example embodiment shown in FIG. 7A. The feed camera 114 may be connected to a bracket 708 that is formed from two members 708$m$1 and 708$m$2 such that the field of view of the feed camera 114 may capture the entirety, or a substantial portion, of the object enhancer 116 and also so that there is a fixed distance between the feed camera 114 and the lower surface of the object enhancer 116. The members 708$m$1 and 708$m$2 of the bracket 708 can have upper ends that are lateral tabs which extend outwards and are connected to a second bracket 710 that has posts 710$p$ upon which the lower surface of the object enhancer 116 is moveably coupled. A lower portion of the members 708$m$1 and 708$m$2 has a channel 708$c$ (only one of which is visible) so that the members 708$m$1 and 708$m$2 can be slid relative to one another so that the corresponding lateral tabs can be extended or retracted to allow the bracket 708 to fit effluent pipes 112 that have a variety of diameters. When the members 708$m$1 and 708$m$2 are properly positioned so that the lateral extending tabs overlap the edge of the effluent pipe 112, a fastener can be applied to the channel 708$c$ to fix the members 708$m$1 and 708$m$2 to one another. The feed camera 114 can be mounted onto the lower horizontal sections of the members 708$m$1 and 708$m$2 so that the field of view of the feed camera 114 is directed towards the object enhancer 116. In at least one implementation of the hardware setup 700, the object enhancer 116 is slidably mounted adjacent to the effluent pipe 112 and the feed camera 114 is coupled to the object enhancer 116 at a fixed distance away from the object enhancer 116 so that the object enhancer 116 can move up and down when different amounts of water flow exit the effluent pipe 112 and the feed camera 114 remains at the fixed distance away from the object enhancer 116. In at least one embodiment, the channel 708$c$ may also be engaged by a fastener, such as a screw, to secure the feed camera 114 to the bracket 708.

The second bracket 710, which may be a U-shaped bracket, has two vertical members 710$v$1 and 710$v$2 which each have a tab that extends laterally and is coupled with the posts 710$p$. The upper lateral tabs of the members 710$v$1 and 710$v$2 are secured to upper tabs of the bracket 708 via fasteners. The bracket 710 also includes lower members 710$m$1 and 710$m$2 that are coupled to the lower end portions of the vertical members 710$v$1 and 710$v$2. The members 710$m$1 and 710$m$2 are moveable with respect to one another and are engaged with one another in a similar manner as described for the bracket configuration of FIGS. 4A-4B.

Figure 7D:
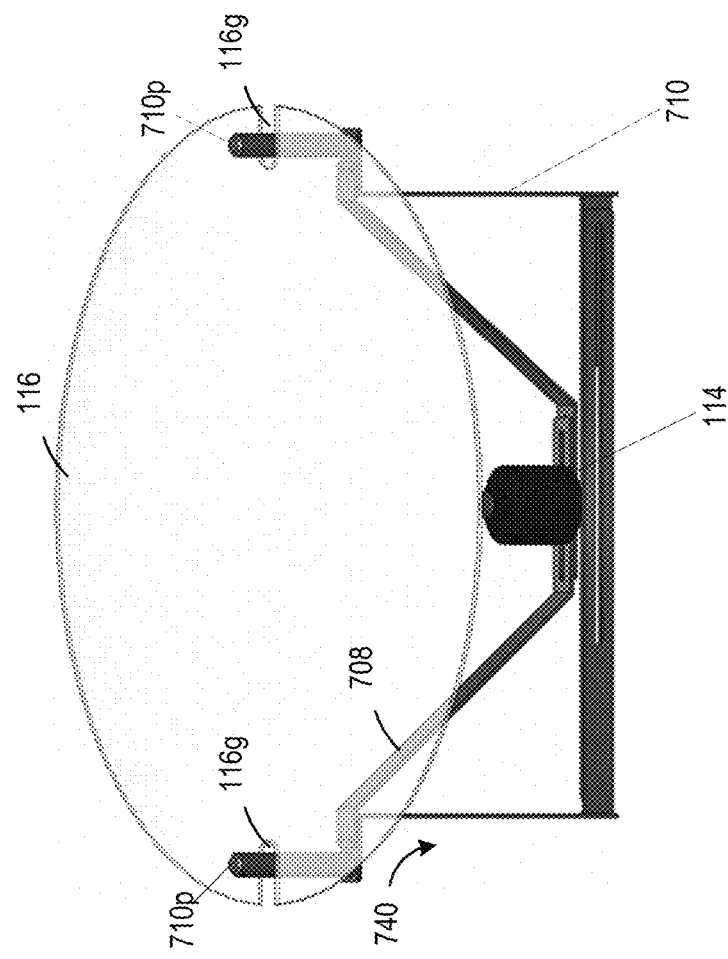
FIG. 7D shows a front perspective view of the bracket configuration of FIG. 7C that incorporates the background enhancer of FIG. 2A.
Figure 7C:
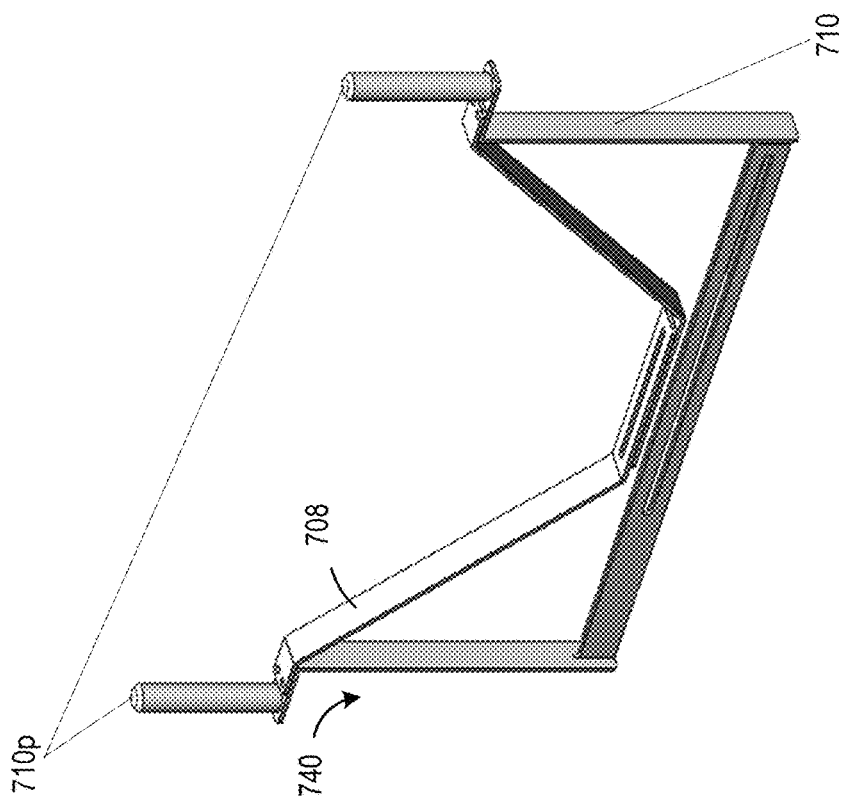
FIG. 7C shows a perspective view of an example embodiment of a bracket configuration for use with the background enhancer of FIG. 2A.

The upper lateral tabs of the second bracket 710 may be secured to the effluent pipe 112 to hold it in place thereto in such a manner that it constricts the ability of the object enhancer 116 and the feed camera 114 to rotate but allows the object enhancer 116 to rise and fall as the water pressure in the effluent pipe 112 changes causing water flow to exit the effluent pipe 112. Together, the bracket 708, bracket 710, and posts 710 may be referred to as a bracket configuration 740 or mounting assembly, which is shown in isolation in FIG. 7C. FIG. 7D shows the bracket configuration 740 with the object enhancer 116 disposed thereon. The feed camera 114 can have a wire to connect it to a network connection (e.g., an ethernet cable). Alternatively, the feed camera 114 can have a wireless connection to an ethernet switch 120.

For example, the bracket 710 may be mounted at an exit port or aperture of the effluent pipe 112 such that the object enhancer 116 is positioned above the exit port of the effluent pipe 112 and can move upwards thereby providing a gap between the bottom surface of the object enhancer 116 and the upper surface of the exit port to allow for water flow to exit the effluent pipe 112 when there is an increase in water pressure in the effluent pipe 112. To accomplish this, the bracket 710 includes a sliding mechanism in the form of the posts 710$p$ which are slidably engaged by grooves 116$g$ that are at two portions of the edges of the object enhancer 116. When the water pressure decreases, the object enhancer 116 can move downwards. When the water pressure increases, the object enhancer 116 can move upwards.

Although not shown, retaining elements may be used to prevent the object enhancer 116 from disengaging the posts 710$p$ of the bracket 710 and floating away from the exit port of the effluent pipe 112. For example, end portions of the posts 710$p$ may have a bulbous end or be flared outwards such that they engage the upper surface of the object enhancer 116 when the water flow is strong enough to lift the object enhancer 116 to the top of the posts 710$p$ and prevent the object enhancer 116 from disengaging from the mount (e.g., posts 710$p$ of bracket 710) at the exit port of the effluent pipe 112.

Optionally, in at least one embodiment, a light may be mounted so that it generates light that is directed to the object enhancer 116. In such cases, the light may be secured to the bracket 710.

One technical advantage realized in at least one of the embodiments described herein is that the pellet counting algorithm effectively counts and tracks individual wasted (i.e., non-eaten) pellets. This is so because other approaches (1) measure an intensity of pellet activity (e.g., detecting a number of pellets in a given image frame to represent the relative level of waste and so they are not actually trying to measure the number of pellets wasted) or (2) track only a small cross-section of pellets (thereby providing a potentially inaccurate estimate). In contrast, the pellet counting algorithm, in accordance with the teachings herein, accurately counts individual wasted pellets passing through the field of view of the feed camera over certain time intervals in real-time to provide an accurate measure, and not an estimation. Depending on the fluid dynamics within the effluent pipe, it is possible that there may be a small (and possibly negligible) number of pellets that hug the sides of the effluent pipe as they move past the feed camera, thus being outside the field of view of the feed camera. In such a case, the pellet count does not result in 100% of the pellets that pass through the exit of the effluent pipe, after scaling as described earlier, but may be marginally lower, such as 95% or 99%. The number of wasted pellets (e.g., uneaten pellets) passing through the field of view of the feed camera may be a predetermined percentage (e.g., 10% or 20%) of the total number of wasted pellets exiting through the effluent pipe, which can then be scaled up by a scale factor (e.g., 10 in the case of the predetermined percentage being 10%, or 5 in the case of the predetermined percentage being 20%) to extrapolate the total number of wasted pellets exiting the tank through the effluent pipe where the predetermined percentage is determined through verification as explained earlier.

Another technical advantage realized in at least one of the embodiments described herein is that the AI-based fish feeding system leverages the infrastructure of land-based recirculating aquaculture systems to create a much more exact count of waste pellets with minimal computational requirements. This is so because every other approach applied in conventional systems attempts to create an estimate (not an exact count) of the number of wasted pellets in a general underwater environment. The pellet counting algorithm in addition to utilizing/manipulating the environment (specifically using the outlet pipe of land-based systems) to monitor fish feed in a smaller physical area is unique to the teachings herein and helpful in being able to count every wasted feed pellet while limiting the computational requirements (e.g., to not require one or more GPUs with high computational power as is usually necessary for CNNs that process large data sets).

Another technical advantage realized in at least one of the embodiments described herein is that the pellet counting algorithm enables a continuous measure of wasted feed while other methods create a discrete measure. This is so because the pellet counting algorithm enables integration with other real-time data sources to understand in real time current feed requirements which may be used to consequently determine future feed requirements.

It should be noted that in at least one embodiment, the object enhancer may not be used when the computer employs processors with sufficiently high processing power, such as GPUs, for example. In such an embodiment, the ROI proposal and ROI classification modules may be replaced with an end-to-end variety of object detection neural network such as a single-shot-detector (SSD) like YOLO or a multi-stage model such as Faster-RCNN.

It should be noted that in at least one embodiment, the pellet counter algorithm may be further configured to generate a control signal based on the pellet count and send the control signal to a fish feeder machine of the fish farm to a generate a new amount of fish feed to provide to the tank. The control signal may be updated at intervals commensurate with the intervals used for counting pellets or the control signal may be instantaneously updated when there is a change in the gradient of uneaten fish feed (i.e., uneaten feed pellets) that is above a threshold that is set to indicate that there may be an issue that has recently arisen in the tank of the fish farm.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A system for feed monitoring in a land-based fish farm having a tank containing fish and an effluent pipe that is coupled to the tank where uneaten feed pellets and non-pellet objects flow through the effluent pipe to an exit port, the system comprising:

a feed camera configured to capture a video feed comprising images of an interior of the effluent pipe including objects that traverse a field of view of the feed camera when each image is acquired, the objects comprising the uneaten feed pellets and the non-pellet objects; and a computing device comprising at least one processor and a memory unit in the form of a non-transient computer-readable medium having stored thereon instructions that when executed cause the at least one processor to perform steps of:

obtaining several images from the video feed for a given time interval;

preprocessing the images to obtain candidate regions of interest (ROIs) that each correspond to unique objects in the images where the objects are potentially feed pellets;

performing classification on the candidate ROIs to obtain a pelletness score representing a probability that the object that corresponds to the candidate ROI belongs to a feed pellet class;

determining whether to retain the candidate ROIs based on a probability that the retained candidate ROI is more likely to belong to the feed pellet class;

assigning each of the retained candidate ROIs into trajectories;

classifying the trajectories into pellet trajectories or non-pellet trajectories; and generating in real time a pellet count based on the pellet trajectories where the pellet count represents a predetermined percentage of the uneaten feed pellets that were not consumed by the fish in the tank.

2. The system of claim 1, wherein the at least one processor is further configured to send the pellet count to the fish farm where the pellet count is used by a fish feeder machine to generate a new amount of fish feed to provide to the tank based at least in part on the pellet count.

3. The system of claim 1, wherein the at least one processor is further configured to generate a control signal based on the pellet count and send the control signal to a fish feeder machine of the fish farm to generate a new amount of fish feed to provide to the tank.

4. The system of claim 1, wherein the at least one processor is further configured to determine gradients of the uneaten feed pellets in the time interval and to generate an alert when one of the gradients is larger than a gradient threshold.

5. The system of claim 1, wherein the at least one processor is configured to obtain the candidate ROIs in a given image frame by performing background subtraction on the given image frame to identify any objects that are likely to change position in subsequent image frames, performing contour detection on the identified objects to define a boundary for each identified object where the boundary is a potential ROI, and filtering the potential ROIs to obtain the candidate ROIs.

6. The system of claim 1, wherein the at least one processor is configured to perform classification on the candidate ROIs by generating samples for each candidate ROI where a given sample includes image data for a corresponding candidate ROI, preprocessing the samples, and applying an ROI classifier to each preprocessed sample to generate a probability distribution with probabilities that the sample belongs to different classes.

7. The system of claim 6, wherein the classes include a pellet class, a non-pellet class, and an ambiguous class.

8. The system of claim 7, wherein the pelletness score represents a probability that the sample belongs to the pellet class.

9. The system of claim 6, wherein the at least one processor is configured to preprocess the samples by resizing the samples to have a same matrix size and performing mean-centering normalization.

10. The system of claim 1, wherein the at least one processor is configured to assign each of the candidate ROIs in one image frame into one of the trajectories by: (a) assigning the candidate ROIs to separate new trajectories when there are no active trajectories; (b) when there are active trajectories, assigning the candidate ROIs to a closest active trajectory when distances between locations of the candidate ROIs and a last ROI in the closest active trajectories is smaller than a distance threshold; or (c) when there are active trajectories, assigning the candidate ROIs to a new active trajectory when distances between locations of the candidate ROIs and a last ROI in the closest active trajectories is larger than the distance threshold.

11. The system of claim 1, wherein the at least one processor is configured to classify the trajectories into pellet trajectories or non-pellet trajectories by identifying finished trajectories which include trajectories that are not updated for one of the images in the given time period, determining at least one trajectory measurement for each of the finished trajectories, and determining which finished trajectories belong to the pellet trajectory class based on the at least one trajectory measurement.

12. The system of claim 11, wherein the at least one processor is configured to determine which finished trajectories belong to the pellet trajectory class by comparing the at least one trajectory measurement to a threshold or providing the at least one trajectory measurement to a trajectory classifier.

13. The system of claim 11, wherein at least one trajectory measurement includes a length of the finished trajectory, a distribution of pelletness scores of ROIs that comprise the finished trajectory, and/or at least one measure of a statistical distribution of one or more other filter values.

14. A computer-implemented method for feed monitoring in a tank of a land-based fish farm, the method comprising:
reading image frames and associated meta-data from a video feed obtained from a feed camera for a given time interval where the image frames obtained by the feed camera are images of uneaten feed pellets and non-pellet objects that are expelled via from the tank;
preprocessing the image frames to obtain candidate regions of interest (ROIs) that each correspond to unique objects in the images where the objects are potentially feed pellets;
performing classification on the candidate ROIs to obtain pelletness scores representing a probability that the objects that correspond to the candidate ROIs belong to a feed pellet class;
determining, using program instructions stored on a memory unit, whether to retain the candidate ROIs based on a probability that the candidate ROI belongs to the feed pellet class;
assigning each of the retained candidate ROIs into trajectories;
classifying the trajectories into pellet trajectories or non-pellet trajectories; and
generating in real time a pellet count based on the pellet trajectories where the pellet count represents a predetermined percentage of the uneaten feed pellets that were not consumed by the fish in the tank.

15. The method of claim 14, wherein the method further comprises sending the pellet count to the fish farm where the pellet count is used by a fish feeder machine to generate a new amount of fish feed to provide to the tank based at least in part on the pellet count.

16. The method of claim 14, wherein the method further comprises generating a control signal based on the pellet count and sending the control signal to a fish feeder machine of the fish farm to a generate a new amount of fish feed to provide to the tank.

17. The method of claim 14, wherein the method further comprises determining gradients of the uneaten feed pellets in the given time interval and generating an alert when one of the gradients is larger than a gradient threshold.

18. The method of claim 14, wherein obtaining the candidate ROIs in a given image frame comprises performing background subtraction on the given image frame to identify any objects that change position in subsequent image frames, performing contour detection on the identified objects to define a boundary for each identified object where the boundary is a potential ROI, and filtering the potential ROIs to obtain the candidate ROIs.

19. The method of claim 14, wherein performing classification on the candidate ROIs comprises generating samples for each candidate ROI where a given sample includes image data for a corresponding candidate ROI, preprocessing the samples, and applying an ROI classifier to each preprocessed sample to generate a probability distribution with probabilities that the sample belongs to different classes.

20. The method of claim 19, wherein the classes include a pellet class, a non-pellet class, and an ambiguous class.

21. The method of claim 20, wherein the pelletness score represents a probability that the sample belongs to the pellet class.

22. The method of claim 14, wherein the method comprises preprocessing the samples by resizing the samples to have a same matrix size and performing mean-centering normalization.

23. The method of claim 14, wherein assigning each of the candidate ROIs in one image frame into one of the trajectories comprises: (a) assigning the candidate ROIs to separate new trajectories when there are no active trajectories; (b) when there are active trajectories, assigning the candidate ROIs to a closest active trajectory when distances between locations of the candidate ROIs and a last ROI in the closest active trajectories is smaller than a distance threshold; or (c) when there are active trajectories, assigning the candidate ROIs to a new active trajectory when distances between locations of the candidate ROIs and a last ROI in the closest active trajectories is larger than the distance threshold.

24. The method of claim 14, wherein classifying the trajectories into pellet trajectories or non-pellet trajectories comprises identifying finished trajectories which include trajectories that are not updated for one of the images in the given time period, determining at least one trajectory measurement for each of the finished trajectories, and determining which finished trajectories belong to the pellet trajectory class based on the at least one trajectory measurement.

25. The method of claim 24, wherein determining which finished trajectories belong to the pellet trajectory class comprises comparing the at least one trajectory measurement to a threshold or providing the at least one trajectory measurement to a trajectory classifier.

26. The method of claim 24, wherein at least one trajectory measurement includes a length of the finished trajectory, a distribution of pelletness scores of ROIs that comprise the finished trajectory, and/or at least one measure of a statistical distribution of one or more filter values.

27. A system for feed monitoring in a land-based fish farm having a tank containing fish, the system comprising:
- a feed camera mounted to an effluent pipe that is coupled to the tank, the feed camera being configured to capture a video feed comprising images of objects that traverse a field of view of the feed camera when each image is acquired, the objects comprising pellets and non-pellet objects; and
- a computing device comprising at least one processor and a non-transient computer-readable medium having stored thereon instructions that when executed cause the at least one processor to perform the method as defined in claim 14.

* * * * *

UNITED STATES PATENT AND TRADEMARK OFFICE
CERTIFICATE OF CORRECTION

PATENT NO. : 11,864,537 B2
APPLICATION NO. : 17/688405
DATED : January 9, 2024
INVENTOR(S) : William Stone and Pedram Adibi It is certified that error appears in the above-identified patent and that said Letters Patent is hereby corrected as shown below:

In the Claims

Claim 14, Column 27, Line 47, "expelled via from the tank" should read -- expelled from the tank --

Signed and Sealed this
Thirtieth Day of April, 2024

Katherine Kelly Vidal
*Director of the United States Patent and Trademark Office*